United States Patent
Kelley

(10) Patent No.: US 10,867,285 B2
(45) Date of Patent: Dec. 15, 2020

(54) AUTOMATIC AUTOMOBILE REPAIR SERVICE SCHEDULING BASED ON DIAGNOSTIC TROUBLE CODES AND SERVICE CENTER ATTRIBUTES

(71) Applicant: CDK Global, LLC, Hoffman Estates, IL (US)

(72) Inventor: Stephen Kelley, Fort Lauderdale, FL (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 557 days.

(21) Appl. No.: 15/134,793

(22) Filed: Apr. 21, 2016

(65) Prior Publication Data
US 2017/0308865 A1    Oct. 26, 2017

(51) Int. Cl.
G06Q 10/10 (2012.01)
G06Q 10/00 (2012.01)
G07C 5/00 (2006.01)
G07C 5/08 (2006.01)

(52) U.S. Cl.
CPC ..... *G06Q 10/1095* (2013.01); *G06Q 10/1097* (2013.01); *G06Q 10/20* (2013.01); *G07C 5/0808* (2013.01); *G07C 5/008* (2013.01)

(58) Field of Classification Search
CPC .............. G06Q 10/1095; G06Q 10/02; G06Q 10/06311; G06Q 10/1097; G07C 5/006; G07C 5/00
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |

(Continued)

FOREIGN PATENT DOCUMENTS

| | | |
|---|---|---|
| CA | 2494350 | 5/2004 |
| EP | 0461888 | 3/1995 |

OTHER PUBLICATIONS

How a solution found a problem of scheduling service appointments Automotive News Feb. 15, 2016 (Year: 2016).*

(Continued)

*Primary Examiner* — Scott L Jarrett
(74) *Attorney, Agent, or Firm* — Stoel Rives LLP

(57) ABSTRACT

A service appointment can be mapped to an automobile. Mapping a service appointment to an automobile can include receiving the diagnostic trouble code (DTC) from the automobile, interpreting, via a computing device, a service operation that resolves the DTC, and updating, via the computing device, the plurality of attributes of the plurality of service centers. Mapping the service appointment to an automobile can also include mapping, via the computing device, the service operation to a selected service center from the plurality of service centers based on the plurality of attributes of the selected service center and scheduling an appointment with the service center.

10 Claims, 9 Drawing Sheets

(56) References Cited

U.S. PATENT DOCUMENTS

| | | | |
|---|---|---|---|
| 5,452,446 | A | 9/1995 | Johnson |
| 5,521,815 | A | 5/1996 | Rose, Jr. |
| 5,649,186 | A | 7/1997 | Ferguson |
| 5,694,595 | A | 12/1997 | Jacobs et al. |
| 5,729,452 | A | 3/1998 | Smith et al. |
| 5,787,177 | A | 7/1998 | Leppek |
| 5,790,785 | A | 8/1998 | Klug et al. |
| 5,835,712 | A | 11/1998 | DuFresne |
| 5,845,299 | A | 12/1998 | Arora et al. |
| 5,862,346 | A | 1/1999 | Kley et al. |
| 5,911,145 | A | 6/1999 | Arora et al. |
| 5,956,720 | A | 9/1999 | Fernandez et al. |
| 5,974,149 | A | 10/1999 | Leppek |
| 5,974,418 | A | 10/1999 | Blinn et al. |
| 5,974,428 | A | 10/1999 | Gerard et al. |
| 5,978,776 | A | 11/1999 | Seretti et al. |
| 5,987,506 | A | 11/1999 | Carter et al. |
| 6,003,635 | A | 12/1999 | Bantz et al. |
| 6,006,201 | A | 12/1999 | Berent et al. |
| 6,009,410 | A | 12/1999 | LeMole et al. |
| 6,018,748 | A | 1/2000 | Smith |
| 6,021,416 | A | 2/2000 | Dauerer et al. |
| 6,021,426 | A | 2/2000 | Douglis et al. |
| 6,026,433 | A | 2/2000 | D'Arlach et al. |
| 6,041,310 | A | 3/2000 | Green et al. |
| 6,041,344 | A | 3/2000 | Bodamer et al. |
| 6,055,541 | A | 4/2000 | Solecki et al. |
| 6,061,698 | A | 5/2000 | Chadha et al. |
| 6,067,559 | A | 5/2000 | Allard et al. |
| 6,070,164 | A | 5/2000 | Vagnozzi |
| 6,134,532 | A | 10/2000 | Lazarus et al. |
| 6,151,609 | A | 11/2000 | Truong |
| 6,178,432 | B1 | 1/2001 | Cook et al. |
| 6,181,994 | B1 | 1/2001 | Colson et al. |
| 6,185,614 | B1 | 2/2001 | Cuomo et al. |
| 6,189,104 | B1 | 2/2001 | Leppek |
| 6,219,667 | B1 | 4/2001 | Lu et al. |
| 6,236,994 | B1 | 5/2001 | Swartz et al. |
| 6,240,365 | B1* | 5/2001 | Bunn ............... G07B 15/00 340/988 |
| 6,263,268 | B1 | 7/2001 | Nathanson |
| 6,285,932 | B1* | 9/2001 | de Bellefeuille ...... G07C 5/008 701/34.3 |
| 6,289,382 | B1 | 9/2001 | Bowman-Amuah |
| 6,295,061 | B1 | 9/2001 | Park et al. |
| 6,330,499 | B1 | 12/2001 | Chou et al. |
| 6,343,302 | B1 | 1/2002 | Graham |
| 6,353,824 | B1 | 3/2002 | Boguraev et al. |
| 6,356,822 | B1 | 3/2002 | Diaz et al. |
| 6,374,241 | B1 | 4/2002 | Lamburt et al. |
| 6,397,226 | B1 | 5/2002 | Sage |
| 6,397,336 | B2 | 5/2002 | Leppek |
| 6,401,103 | B1 | 6/2002 | Ho et al. |
| 6,421,733 | B1 | 7/2002 | Tso et al. |
| 6,473,849 | B1 | 10/2002 | Keller et al. |
| 6,496,855 | B1 | 12/2002 | Hunt et al. |
| 6,505,106 | B1 | 1/2003 | Lawrence et al. |
| 6,505,205 | B1 | 1/2003 | Kothuri et al. |
| 6,519,617 | B1 | 2/2003 | Wanderski et al. |
| 6,535,879 | B1 | 3/2003 | Behera |
| 6,539,370 | B1 | 3/2003 | Chang et al. |
| 6,546,216 | B2 | 4/2003 | Mizoguchi et al. |
| 6,553,373 | B2 | 4/2003 | Boguraev et al. |
| 6,556,904 | B1 | 4/2003 | Larson et al. |
| 6,564,216 | B2 | 5/2003 | Waters |
| 6,571,253 | B1 | 5/2003 | Thompson et al. |
| 6,581,061 | B2 | 6/2003 | Graham |
| 6,583,794 | B1 | 6/2003 | Wattenberg |
| 6,594,664 | B1 | 7/2003 | Estrada et al. |
| 6,606,525 | B1 | 8/2003 | Muthuswamy et al. |
| 6,629,148 | B1 | 9/2003 | Ahmed et al. |
| 6,643,663 | B1 | 11/2003 | Dabney et al. |
| 6,654,726 | B1 | 11/2003 | Hanzek |
| 6,678,706 | B1 | 1/2004 | Fishel |
| 6,697,825 | B1 | 2/2004 | Underwood et al. |
| 6,701,232 | B2 | 3/2004 | Yamaki |
| 6,721,747 | B2 | 4/2004 | Lipkin |
| 6,728,685 | B1 | 4/2004 | Ahluwalia |
| 6,738,750 | B2 | 5/2004 | Stone et al. |
| 6,744,735 | B1 | 6/2004 | Nakaguro |
| 6,748,305 | B1 | 6/2004 | Klausner et al. |
| 6,785,864 | B1 | 8/2004 | Te et al. |
| 6,795,819 | B2 | 9/2004 | Wheeler et al. |
| 6,823,258 | B2* | 11/2004 | Ukai ............... G01S 5/0027 340/436 |
| 6,823,359 | B1 | 11/2004 | Heidingsfeld |
| 6,826,594 | B1 | 11/2004 | Pettersen |
| 6,847,988 | B2 | 1/2005 | Toyouchi et al. |
| 6,850,823 | B2 | 2/2005 | Eun et al. |
| 6,871,216 | B2 | 3/2005 | Miller et al. |
| 6,901,430 | B1 | 3/2005 | Smith |
| 6,894,601 | B1 | 5/2005 | Grunden et al. |
| 6,917,941 | B2 | 7/2005 | Wight et al. |
| 6,922,674 | B1 | 7/2005 | Nelson |
| 6,941,203 | B2* | 9/2005 | Chen ............... G06Q 90/00 701/31.6 |
| 6,944,677 | B1 | 9/2005 | Zhao |
| 6,963,854 | B1 | 11/2005 | Boyd et al. |
| 6,965,806 | B2* | 11/2005 | Eryurek ............ G05B 13/0275 700/96 |
| 6,965,968 | B1 | 11/2005 | Touboul |
| 6,978,273 | B1 | 12/2005 | Bonneau et al. |
| 6,981,028 | B1 | 12/2005 | Rawat et al. |
| 6,990,629 | B1 | 1/2006 | Heaney et al. |
| 6,993,421 | B2 | 1/2006 | Pillar |
| 7,000,184 | B2 | 2/2006 | Matveyenko et al. |
| 7,003,476 | B1 | 2/2006 | Samra et al. |
| 7,028,072 | B1 | 4/2006 | Kliger et al. |
| 7,031,554 | B2 | 4/2006 | Iwane |
| 7,039,704 | B2 | 5/2006 | Davis et al. |
| 7,047,318 | B1 | 5/2006 | Svedloff |
| 7,062,343 | B2 | 6/2006 | Ogushi et al. |
| 7,062,506 | B2 | 6/2006 | Taylor et al. |
| 7,072,943 | B2 | 7/2006 | Landesmann |
| 7,092,803 | B2 | 8/2006 | Kapolka et al. |
| 7,107,268 | B1 | 9/2006 | Zawadzki et al. |
| 7,124,116 | B2 | 10/2006 | Huyler |
| 7,152,207 | B1 | 12/2006 | Underwood et al. |
| 7,155,491 | B1 | 12/2006 | Schultz et al. |
| 7,171,418 | B2 | 1/2007 | Blessin |
| 7,184,866 | B2 | 2/2007 | Squires et al. |
| 7,197,764 | B2 | 3/2007 | Cichowlas |
| 7,219,234 | B1 | 5/2007 | Ashland et al. |
| 7,240,125 | B2 | 7/2007 | Fleming |
| 7,246,263 | B2 | 7/2007 | Skingle |
| 7,281,029 | B2 | 10/2007 | Rawat |
| 7,287,000 | B2 | 10/2007 | Boyd et al. |
| 7,322,007 | B2 | 1/2008 | Schowtka et al. |
| 7,386,786 | B2 | 6/2008 | Davis et al. |
| 7,401,289 | B2 | 7/2008 | Lachhwani et al. |
| 7,406,429 | B2* | 7/2008 | Salonen ............ H04W 12/06 705/5 |
| 7,433,891 | B2 | 10/2008 | Haber et al. |
| 7,457,693 | B2* | 11/2008 | Olsen ............... B60R 25/1004 701/29.3 |
| 7,477,968 | B1 | 1/2009 | Lowrey |
| 7,480,551 | B1 | 1/2009 | Lowrey et al. |
| 7,496,543 | B1 | 2/2009 | Bamford et al. |
| 7,502,672 | B1* | 3/2009 | Kolls ............... G06Q 30/02 340/988 |
| 7,536,641 | B2 | 5/2009 | Rosenstein et al. |
| 7,548,985 | B2 | 6/2009 | Guigui |
| 7,587,504 | B2 | 9/2009 | Adams et al. |
| 7,590,476 | B2 | 9/2009 | Shumate |
| 7,593,925 | B2 | 9/2009 | Cadiz et al. |
| 7,593,999 | B2 | 9/2009 | Nathanson |
| 7,613,627 | B2 | 11/2009 | Doyle et al. |
| 7,620,484 | B1 | 11/2009 | Chen |
| 7,624,342 | B2 | 11/2009 | Matveyenko et al. |
| 7,657,594 | B2 | 2/2010 | Banga et al. |
| 7,664,667 | B1* | 2/2010 | Ruppelt ............ G06Q 10/06311 705/7.13 |
| 7,739,007 | B2 | 6/2010 | Logsdon |
| 7,747,680 | B2 | 6/2010 | Ravikumar et al. |

(56) References Cited

U.S. PATENT DOCUMENTS

| | | |
|---|---|---|
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2* | 8/2011 | Bodin ................ G06Q 40/00 705/35 |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2* | 11/2011 | Boss .................... G08G 1/205 701/29.4 |
| 8,095,403 B2* | 1/2012 | Price ................. G06Q 10/06 705/29 |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2* | 5/2012 | Lin ..................... G07C 5/008 701/31.5 |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,521,654 B2* | 8/2013 | Ford .................. G06Q 10/20 705/303 |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2* | 5/2014 | Ogasawara ........ G01C 21/3605 701/23 |
| 8,849,689 B1* | 9/2014 | Jagannathan ...... G06Q 10/1095 705/7.12 |
| 8,886,389 B2* | 11/2014 | Edwards ............ G01C 21/362 455/404.2 |
| 8,924,071 B2 | 12/2014 | Stanek et al. |
| 8,954,222 B2* | 2/2015 | Costantino ........ G05B 23/0272 701/32.1 |
| 8,996,230 B2* | 3/2015 | Lorenz ................ G06F 17/00 701/29.1 |
| 8,996,235 B2* | 3/2015 | Singh ................. G05B 23/0278 701/29.4 |
| 9,014,908 B2* | 4/2015 | Chen .................. G05B 23/0272 701/29.6 |
| 9,015,059 B2* | 4/2015 | Sims, III ............ G05B 19/4184 705/7.11 |
| 9,026,304 B2 | 5/2015 | Olsen, III et al. |
| 9,047,722 B2* | 6/2015 | Kurnik ................ G07C 5/085 |
| 9,165,413 B2 | 10/2015 | Jones et al. |
| 9,183,681 B2* | 11/2015 | Fish .................... G06F 3/00 |
| 9,325,650 B2 | 4/2016 | Yalavarty et al. |
| 9,349,223 B1 | 5/2016 | Palmer |
| 9,384,597 B2 | 7/2016 | Koch et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 10,032,139 B2* | 7/2018 | Adderly .............. G06Q 10/1095 |
| 10,083,411 B2* | 9/2018 | Kinsey, II ......... G06Q 10/063116 |
| 10,229,394 B1 | 3/2019 | Davis et al. |
| 10,475,256 B2 | 11/2019 | Chowdhury et al. |
| 2001/0005831 A1* | 6/2001 | Lewin .................... G06Q 10/02 705/5 |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1* | 2/2002 | Jones .................... G06Q 10/06 715/763 |
| 2002/0026359 A1 | 2/2002 | Long et al. |
| 2002/0032626 A1 | 3/2002 | DeWolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1* | 5/2002 | Schick ................ B61L 27/0094 705/7.36 |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1* | 8/2002 | Vanstory ................ G06Q 10/20 701/32.6 |
| 2002/0111844 A1* | 8/2002 | Vanstory ................ G06Q 10/06 705/7.13 |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1* | 9/2002 | Murakami ......... G05B 23/0245 700/10 |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1* | 2/2003 | Kokes .................... G07C 5/008 701/31.4 |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1* | 3/2003 | Roddy ................ B61L 27/0094 705/305 |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1* | 5/2003 | Dix ........................ G07C 5/008 340/425.5 |
| 2003/0101262 A1* | 5/2003 | Godwin .................. G06Q 10/06 709/224 |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |

(56) References Cited

U.S. PATENT DOCUMENTS

| | | | |
|---|---|---|---|
| 2004/0041818 A1 | 3/2004 | White et al. | |
| 2004/0073546 A1 | 4/2004 | Forster et al. | |
| 2004/0073564 A1 | 4/2004 | Haber et al. | |
| 2004/0088228 A1 | 5/2004 | Mercer et al. | |
| 2004/0093243 A1* | 5/2004 | Bodin | G06Q 10/02 705/5 |
| 2004/0117046 A1* | 6/2004 | Colle | G06Q 10/06 700/99 |
| 2004/0122735 A1 | 6/2004 | Meshkin et al. | |
| 2004/0128320 A1 | 7/2004 | Grove et al. | |
| 2004/0139203 A1 | 7/2004 | Graham, Jr. et al. | |
| 2004/0148342 A1 | 7/2004 | Cotte | |
| 2004/0156020 A1 | 8/2004 | Edwards | |
| 2004/0163047 A1 | 8/2004 | Nagahara et al. | |
| 2004/0181464 A1 | 9/2004 | Vanker et al. | |
| 2004/0199413 A1* | 10/2004 | Hauser | G06Q 10/06 705/304 |
| 2004/0220778 A1* | 11/2004 | Imai | G05B 23/027 702/188 |
| 2004/0220863 A1 | 11/2004 | Porter et al. | |
| 2004/0225664 A1 | 11/2004 | Casement | |
| 2004/0230897 A1 | 11/2004 | Latzel | |
| 2004/0255233 A1 | 12/2004 | Croney et al. | |
| 2004/0267263 A1 | 12/2004 | May | |
| 2004/0268225 A1 | 12/2004 | Walsh et al. | |
| 2004/0268232 A1 | 12/2004 | Tunning | |
| 2005/0015491 A1 | 1/2005 | Koeppel | |
| 2005/0021197 A1* | 1/2005 | Zimmerman | G06Q 10/10 701/31.4 |
| 2005/0065804 A1 | 3/2005 | Worsham et al. | |
| 2005/0096963 A1 | 5/2005 | Myr et al. | |
| 2005/0108112 A1 | 5/2005 | Ellenson et al. | |
| 2005/0114270 A1 | 5/2005 | Hind et al. | |
| 2005/0114764 A1 | 5/2005 | Gudenkauf et al. | |
| 2005/0108637 A1 | 6/2005 | Sahota et al. | |
| 2005/0149398 A1 | 7/2005 | McKay | |
| 2005/0171836 A1 | 8/2005 | Leacy | |
| 2005/0176482 A1* | 8/2005 | Raisinghani | B60R 16/0234 455/575.9 |
| 2005/0187834 A1* | 8/2005 | Painter | G06Q 10/08 705/28 |
| 2005/0228736 A1 | 10/2005 | Norman et al. | |
| 2005/0267774 A1 | 12/2005 | Merritt et al. | |
| 2005/0268282 A1 | 12/2005 | Laird | |
| 2005/0289020 A1 | 12/2005 | Bruns et al. | |
| 2005/0289599 A1 | 12/2005 | Matsuura et al. | |
| 2006/0031811 A1 | 2/2006 | Ernst et al. | |
| 2006/0059253 A1 | 3/2006 | Goodman et al. | |
| 2006/0064637 A1 | 3/2006 | Rechterman et al. | |
| 2006/0123330 A1 | 6/2006 | Horiuchi et al. | |
| 2006/0129423 A1 | 6/2006 | Sheinson et al. | |
| 2006/0129982 A1 | 6/2006 | Doyle | |
| 2006/0136105 A1* | 6/2006 | Larson | G06Q 10/06 701/29.5 |
| 2006/0161841 A1 | 7/2006 | Horiuchi et al. | |
| 2006/0200751 A1 | 9/2006 | Underwood et al. | |
| 2006/0248442 A1 | 11/2006 | Rosenstein et al. | |
| 2006/0265355 A1 | 11/2006 | Taylor | |
| 2006/0271844 A1 | 11/2006 | Suklikar | |
| 2006/0277588 A1 | 12/2006 | Harrington et al. | |
| 2007/0005446 A1 | 1/2007 | Fusz et al. | |
| 2007/0016486 A1 | 1/2007 | Stone et al. | |
| 2007/0027754 A1 | 2/2007 | Collins et al. | |
| 2007/0033087 A1* | 2/2007 | Combs | G06Q 10/06 705/7.12 |
| 2007/0033520 A1 | 2/2007 | Kimzey et al. | |
| 2007/0053513 A1 | 3/2007 | Hoffberg | |
| 2007/0100519 A1 | 5/2007 | Engel | |
| 2007/0150368 A1 | 6/2007 | Arora et al. | |
| 2007/0209011 A1 | 9/2007 | Padmanabhuni et al. | |
| 2007/0226540 A1 | 9/2007 | Konieczny | |
| 2007/0250229 A1* | 10/2007 | Wu | G06Q 10/06 701/31.4 |
| 2007/0250327 A1 | 10/2007 | Hedy | |
| 2007/0271154 A1 | 11/2007 | Broudy et al. | |
| 2007/0271330 A1 | 11/2007 | Mattox et al. | |
| 2007/0271389 A1 | 11/2007 | Joshi et al. | |
| 2007/0282711 A1 | 12/2007 | Ullman et al. | |
| 2007/0282712 A1 | 12/2007 | Ullman et al. | |
| 2007/0282713 A1 | 12/2007 | Ullman et al. | |
| 2007/0288413 A1 | 12/2007 | Mizuno et al. | |
| 2007/0294192 A1 | 12/2007 | Tellefsen | |
| 2008/0010561 A1 | 1/2008 | Bay et al. | |
| 2008/0015929 A1 | 1/2008 | Koeppel et al. | |
| 2008/0027827 A1 | 1/2008 | Eglen et al. | |
| 2008/0119983 A1 | 5/2008 | Inbarajan et al. | |
| 2008/0172632 A1 | 7/2008 | Stambaugh | |
| 2008/0189143 A1* | 8/2008 | Wurster | G06Q 10/02 705/5 |
| 2008/0195435 A1 | 8/2008 | Bentley et al. | |
| 2008/0195932 A1 | 8/2008 | Oikawa et al. | |
| 2008/0201163 A1 | 8/2008 | Barker et al. | |
| 2008/0255925 A1 | 10/2008 | Vailaya et al. | |
| 2009/0012887 A1 | 1/2009 | Taub et al. | |
| 2009/0024918 A1 | 1/2009 | Silverbrook et al. | |
| 2009/0043780 A1 | 2/2009 | Hentrich, Jr. et al. | |
| 2009/0070435 A1 | 3/2009 | Abhyanker | |
| 2009/0089134 A1* | 4/2009 | Uyeki | G06Q 10/02 705/7.19 |
| 2009/0106036 A1* | 4/2009 | Tamura | G06Q 10/109 705/305 |
| 2009/0112687 A1 | 4/2009 | Blair et al. | |
| 2009/0182232 A1 | 7/2009 | Zhang et al. | |
| 2009/0187939 A1 | 7/2009 | Lajoie | |
| 2009/0204454 A1 | 8/2009 | Lagudi | |
| 2009/0222532 A1 | 9/2009 | Finlaw | |
| 2009/0265607 A1 | 10/2009 | Raz et al. | |
| 2009/0313035 A1 | 12/2009 | Esser et al. | |
| 2010/0023393 A1 | 1/2010 | Costy et al. | |
| 2010/0070343 A1 | 3/2010 | Taira et al. | |
| 2010/0082778 A1 | 4/2010 | Muilenburg et al. | |
| 2010/0082780 A1 | 4/2010 | Muilenburg et al. | |
| 2010/0088158 A1 | 4/2010 | Pollack | |
| 2010/0100259 A1* | 4/2010 | Geiter | G06N 5/045 701/3 |
| 2010/0100506 A1 | 4/2010 | Marot | |
| 2010/0235219 A1 | 9/2010 | Merrick et al. | |
| 2010/0293030 A1* | 11/2010 | Wu | G06Q 10/06 705/7.36 |
| 2010/0312608 A1 | 12/2010 | Shan et al. | |
| 2010/0318408 A1 | 12/2010 | Sankaran et al. | |
| 2010/0324777 A1* | 12/2010 | Tominaga | G07C 5/008 701/31.4 |
| 2011/0010432 A1* | 1/2011 | Uyeki | G06Q 10/087 709/219 |
| 2011/0022525 A1 | 1/2011 | Swinson et al. | |
| 2011/0082804 A1 | 4/2011 | Swinson et al. | |
| 2011/0145064 A1 | 6/2011 | Anderson et al. | |
| 2011/0161167 A1 | 6/2011 | Jallapuram | |
| 2011/0191264 A1 | 8/2011 | Inghelbrecht et al. | |
| 2011/0196762 A1 | 8/2011 | DuPont | |
| 2011/0224864 A1* | 9/2011 | Gellatly | G01C 21/3679 701/29.5 |
| 2011/0231055 A1 | 9/2011 | Knight et al. | |
| 2011/0307411 A1 | 12/2011 | Bolivar et al. | |
| 2012/0066010 A1 | 3/2012 | Williams et al. | |
| 2012/0089474 A1* | 4/2012 | Xiao | G06Q 10/06311 705/26.4 |
| 2012/0095804 A1 | 4/2012 | Calabrese et al. | |
| 2012/0158211 A1 | 6/2012 | Chen et al. | |
| 2012/0209714 A1 | 8/2012 | Douglas et al. | |
| 2012/0221125 A1* | 8/2012 | Bell | B29C 70/10 700/32 |
| 2012/0268294 A1 | 10/2012 | Michaelis et al. | |
| 2012/0278886 A1 | 11/2012 | Luna | |
| 2012/0316981 A1 | 12/2012 | Hoover et al. | |
| 2013/0046432 A1* | 2/2013 | Edwards | G01C 21/3605 701/29.4 |
| 2013/0080196 A1* | 3/2013 | Schroeder | G06Q 10/02 705/5 |
| 2013/0204484 A1* | 8/2013 | Ricci | G06F 17/00 701/29.4 |

(56) References Cited

U.S. PATENT DOCUMENTS

| | | | |
|---|---|---|---|
| 2013/0325541 A1* | 12/2013 | Capriotti | G06Q 10/20 705/7.21 |
| 2013/0332023 A1* | 12/2013 | Bertosa | G07C 5/006 701/29.4 |
| 2014/0026037 A1 | 1/2014 | Garb et al. | |
| 2014/0052327 A1* | 2/2014 | Hosein | G07C 5/0808 701/29.4 |
| 2014/0088866 A1* | 3/2014 | Knapp | G06Q 10/06 701/467 |
| 2014/0094992 A1 | 4/2014 | Lambert et al. | |
| 2014/0229391 A1* | 8/2014 | East, III | G06Q 10/20 705/305 |
| 2014/0244110 A1 | 8/2014 | Tharaldson et al. | |
| 2014/0277906 A1* | 9/2014 | Lowrey | G07C 5/008 701/29.4 |
| 2014/0278805 A1 | 9/2014 | Thompson | |
| 2014/0324275 A1* | 10/2014 | Stanek | G07C 5/0816 701/31.4 |
| 2014/0337163 A1 | 11/2014 | Whisnant | |
| 2014/0379530 A1* | 12/2014 | Kim | G07F 17/20 705/26.81 |
| 2015/0057875 A1* | 2/2015 | McGinnis | G05B 19/418 701/31.6 |
| 2015/0066781 A1* | 3/2015 | Johnson | G06Q 30/0206 705/305 |
| 2015/0066933 A1 | 3/2015 | Kolodziej et al. | |
| 2015/0100199 A1* | 4/2015 | Kurnik | G07C 5/0808 701/32.4 |
| 2015/0142256 A1* | 5/2015 | Jones | G06Q 10/06 701/31.4 |
| 2015/0227894 A1 | 8/2015 | Mapes, Jr. et al. | |
| 2015/0268059 A1* | 9/2015 | Borghesani | H04W 4/029 701/32.3 |
| 2015/0278886 A1 | 10/2015 | Fusz | |
| 2015/0286979 A1* | 10/2015 | Ming | G06Q 10/06311 705/7.14 |
| 2016/0004516 A1 | 1/2016 | Ivanov et al. | |
| 2016/0071054 A1 | 3/2016 | Kakarala et al. | |
| 2016/0092944 A1* | 3/2016 | Taylor | G06Q 30/0281 705/5 |
| 2016/0140622 A1 | 5/2016 | Wang et al. | |
| 2016/0148439 A1* | 5/2016 | Akselrod | G07C 5/085 701/23 |
| 2016/0180358 A1 | 6/2016 | Battista | |
| 2016/0180378 A1 | 6/2016 | Toshida et al. | |
| 2016/0180418 A1 | 6/2016 | Jaeger | |
| 2016/0267503 A1 | 9/2016 | Zakai-Or et al. | |
| 2016/0307174 A1 | 10/2016 | Marcelle et al. | |
| 2016/0357599 A1 | 12/2016 | Glatfelter | |
| 2017/0039785 A1* | 2/2017 | Richter | G07C 5/008 |
| 2017/0053460 A1 | 2/2017 | Hauser et al. | |
| 2017/0124525 A1* | 5/2017 | Johnson | G06Q 10/063116 |
| 2017/0308844 A1 | 10/2017 | Kelley | |
| 2017/0308864 A1 | 10/2017 | Kelley | |
| 2017/0316459 A1 | 11/2017 | Strauss et al. | |
| 2017/0337573 A1 | 11/2017 | Toprak | |
| 2018/0232749 A1 | 8/2018 | Moore, Jr. et al. | |
| 2018/0285901 A1 | 10/2018 | Zackrone | |
| 2018/0285925 A1 | 10/2018 | Zackrone | |
| 2019/0297162 A1 | 9/2019 | Amar et al. | |
| 2020/0038363 A1 | 2/2020 | Kim | |

OTHER PUBLICATIONS

An Appointment With Destiny—The Time for Web-Enabled Scheduling Has Arrived Link Fall 2007 (Year: 2007).*

Emmanuel, Daniel, Basics to Creating an Appointment System for Automotive Service Customers AutomotiveServiceManagement.com, 2006 (Year: 2006).*

Croswell, Wayne, Service Shop Optimization Modern Tire Dealer, May 21, 2013 (Year: 2013).*

Service Advisor Automotive Dealership Institute, 2007 (Year: 2007).* xTime.com Web Pages Xtime, Inc., Jan. 8, 2015, Retrieved from Archive.org Jan. 24, 2019 (Year: 2015).*

Xtimes in Focus xtime, vol. 7, 2013 (Year: 2013).*

Final Office Action for U.S. Appl. No. 13/025,019, filed Feb. 20, 2011, and mailed from the USPTO dated Dec. 20, 2016, 16 pgs.

"NetFormx Offers Advanced Network Discovery Software". PR Newswire. Mar. 15, 1999. Retrieved from http://www.highbeam.com/doc/1G1-54102907.html>.

Advisory Action for U.S. Appl. No. 14/208,042, filed Mar. 13, 2014, and mailed from the USPTO dated Jul. 12, 2018.

Aloisio, Giovanni et al., "Web-based access to the Grid using the Grid Resource Broker portal," Google 2002, pp. 1145-1160.

Anonymous, "Software ready for prime time." Automotive News. Detroit, Nov. 5, 2001. vol. 76, Issue 5996, p. 28.

Chadwick, D. W., "Understanding X.500—The Directory." Available at <http://sec.cs.kent.ac.uk/x500book/>. 1996. Entire work cited.

Chen, Deren, "Business to Business Standard and Supply Chain System Framework in Virtual Enterprises," Computer Supported Cooperative Work in Design, The Sixth International Conference on, 2001; Publication Year: 2001, pp. 472-476.

CNY Business Journal, "Frank La Voila named Southern Tier Small-Business Person of 1999". Jun. 11, 1999. 2 pgs.

Dallas Morning News, "I know someone who knows Kevin Bacon". Oct. 27, 1998. 4 pgs.

Davis, Peter T. et al., "Sams Teach Yourself Microsoft Windows NT Server 4 in 21 Days," Sams® Publishing, © 1999. ISBN: 0-672-31555-6, 15 pgs., printed Dec. 21, 2008.

Derfler, Frank J. et al., "How Networks Work: Millennium Edition," Que, A Division of Macmillan Computer Publishing, © 2000. ISBN: 0-7897-2445-6, 9 pgs.

Final Office Action for U.S. Appl. No. 10/350,795, filed Jan. 24, 2003, and mailed from the USPTO dated Jul. 6, 2011, 26 pgs.

Final Office Action for U.S. Appl. No. 10/350,795, filed Jan. 24, 2003, and mailed from the USPTO dated Mar. 3, 2010, 24 pgs.

Final Office Action for U.S. Appl. No. 10/350,810, filed Jan. 24, 2003, and mailed from the USPTO dated Apr. 5, 2005, 12 pgs.

Final Office Action for U.S. Appl. No. 10/350,810, filed Jan. 24, 2003, and mailed from the USPTO dated May 18, 2006, 15 pgs.

Final Office Action for U.S. Appl. No. 10/350,810, filed Jan. 24, 2003, and mailed from the USPTO dated Nov. 14, 2007, 13 pgs.

Final Office Action for U.S. Appl. No. 10/351,465, filed Jan. 24, 2003, and mailed from the USPTO dated May 5, 2005, 8 pgs.

Final Office Action for U.S. Appl. No. 10/665,899, filed Sep. 18, 2003, and mailed from the USPTO dated Feb. 24, 2010, 22 pgs.

Final Office Action for U.S. Appl. No. 10/665,899, filed Sep. 18, 2003, and mailed from the USPTO dated Jul. 7, 2008, 11 pgs.

Final Office Action for U.S. Appl. No. 10/665,899, filed Sep. 18, 2003, and mailed from the USPTO dated Mar. 8, 2011, 21 pgs.

Final Office Action for U.S. Appl. No. 10/665,899, filed Sep. 18, 2003, and mailed from the USPTO dated May 11, 2009, 14 pgs.

Final Office Action for U.S. Appl. No. 11/149,909, filed Jun. 10, 2005, and mailed from the USPTO dated Feb. 4, 2009, 14 pgs.

Final Office Action for U.S. Appl. No. 11/442,821, filed May 30, 2006, and mailed from the USPTO dated Apr. 7, 2009, 19 pgs.

Final Office Action for U.S. Appl. No. 11/442,821, filed May 30, 2006, and mailed from the USPTO dated May 21, 2010, 28 pgs.

Final Office Action for U.S. Appl. No. 11/442,821, filed May 30, 2006, and mailed from the USPTO dated Nov. 29, 2011, 26 pgs.

Final Office Action for U.S. Appl. No. 11/446,011, filed Jun. 2, 2006, and mailed from the USPTO dated Jun. 8, 2010, 12 pgs.

Final Office Action for U.S. Appl. No. 11/524,602, filed Sep. 21, 2006, and mailed from the USPTO dated Jul. 27, 2010, 13 pgs.

Final Office Action for U.S. Appl. No. 11/524,602, filed Sep. 21, 2006, and mailed from the USPTO dated Jun. 26, 2012, 11 pgs.

Final Office Action for U.S. Appl. No. 11/525,009, filed Sep. 21, 2006, and mailed from the USPTO dated Aug. 3, 2010, 16 pgs.

Final Office Action for U.S. Appl. No. 12/243,852, filed Oct. 1, 2008, and mailed from the USPTO dated Oct. 24, 2011, 13 pgs.

Final Office Action for U.S. Appl. No. 12/243,861, filed Oct. 1, 2008, and mailed from the USPTO dated Jun. 22, 2011, 5 pgs.

Final Office Action for U.S. Appl. No. 13/025,019, filed Feb. 10, 2011, and mailed from the USPTO dated Aug. 28, 2015, 25 pgs.

(56) References Cited

OTHER PUBLICATIONS

Final Office Action for U.S. Appl. No. 13/025,019, filed Feb. 10, 2011, and mailed from the USPTO dated Jul. 13, 2018, 11 pgs.
Final Office Action for U.S. Appl. No. 13/025,019, filed Feb. 10, 2011, and mailed from the USPTO dated Sep. 12, 2013, 13 pgs.
Final Office Action for U.S. Appl. No. 14/208,042, filed Mar. 13, 2014, and mailed from the USPTO dated Apr. 16, 2018.
Final Office Action for U.S. Appl. No. 14/208,042, filed Mar. 13, 2014, and mailed from the USPTO dated Dec. 6, 2016, 26 pgs.
Final Office Action for U.S. Appl. No. 15/602,999, filed May 23, 2017, and mailed from USPTO dated Nov. 21, 2018.
Final Office Action dated Sep. 21, 2018 in U.S. Appl. No. 15/134,820.
Hogue et al., "Thresher: Automating the Unwrapping of Semantic Content from the World Wide Web," ACM 2005, pp. 86-95.
Housel, Barron C. et al., WebExpress: a client/intercept based system for optimizing Web browsing in a wireless environment, Google 1998, pp. 419-431.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
IBM Tivoli Access Manager Base Administration Guide, Version 5.1. 2003, International Business Machines Corporation. Entire book enclosed and cited. 402 pgs.
Interconnection. (2003). In Roget's II The New Thesaurus. Boston, MA: Houghton Mifflin. Retrieved Jul. 16, 2009, from http://www.credoreference.com/entry/hmrogets/interconnection, 1 pg.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wkipedia, the free encyclopedia, printed Mar. 6, 2010, 9 pgs.
Michener, J.R., et al., "Managing System and Active-Content Integrity," Computer; vol. 33, Issue: 7; Publication Year: 2000, pp. 108-110.
Milic-Frayling, Natasa, et al., "SmartView: Enhanced Document Viewer for Mobile Devices," Google Nov. 15, 2002, 11 pgs.
Non-Final Office Action for U.S. Appl. No. 10/350,795, filed Jan. 24, 2003, and mailed from the USPTO dated Dec. 26, 2008, 13 pgs.
Non-Final Office Action for U.S. Appl. No. 10/350,795, filed Jan. 24, 2003, and mailed from the USPTO dated Feb. 6, 2006, 11 pgs.
Non-Final Office Action for U.S. Appl. No. 10/350,795, filed Jan. 24, 2003, and mailed from the USPTO dated Jul. 22, 2009, 22 pgs.
Non-Final Office Action for U.S. Appl. No. 10/350,795, filed Jan. 24, 2003, and mailed from the USPTO dated Jun. 29, 2006, 11 pgs.
Non-Final Office Action for U.S. Appl. No. 10/350,795, filed Jan. 24, 2003, and mailed from the USPTO dated Mar. 12, 2007, 10 pgs.
Non-Final Office Action for U.S. Appl. No. 10/350,795, filed Jan. 24, 2003, and mailed from the USPTO dated May 29, 2008, 10 pgs.
Non-Final Office Action for U.S. Appl. No. 10/350,795, filed Jan. 24, 2003, and mailed from the USPTO dated Nov. 1, 2010, 19 pgs.
Non-Final Office Action for U.S. Appl. No. 10/350,796, filed Jan. 24, 2003 and mailed from the USPTO dated May 19, 2005, 7 pgs.
Non-Final Office Action for U.S. Appl. No. 10/350,810, filed Jan. 24, 2003, and mailed from the USPTO dated Apr. 17, 2007, 12 pgs.
Non-Final Office Action for U.S. Appl. No. 10/350,810, filed Jan. 24, 2003, and mailed from the USPTO dated Dec. 9, 2005, 14 pgs.
Non-Final Office Action for U.S. Appl. No. 10/350,810, filed Jan. 24,2003, and mailed from the USPTO dated Sep. 22, 2004, 10 pgs.
Non-Final Office Action for U.S. Appl. No. 10/351,465, filed Jan. 24, 2003, and mailed from the USPTO dated Jul. 27, 2004, 9 pgs.
Non-final Office Action for U.S. Appl. No. 10/351,606, filed Jan. 24, 2003 and mailed from the USPTO dated Dec. 19, 2005, 7 pgs.
Non-final Office Action for U.S. Appl. No. 10/351,606, filed Jan. 24, 2003 and mailed from the USPTO dated May 17, 2004, 5 pgs.
Non-Final Office Action for U.S. Appl. No. 10/351,606, filed Jan. 24, 2003, and mailed from the USPTO dated May 17, 2004, 6 pgs.
Non-Final Office Action for U.S. Appl. No. 10/665,899, filed Sep. 18, 2003, and mailed from the USPTO dated Aug. 30, 2010, 23 pgs.
Non-Final Office Action for U.S. Appl. No. 10/665,899, filed Sep. 18, 2003, and mailed from the USPTO dated Nov. 13, 2008, 11 pgs.
Non-Final Office Action for U.S. Appl. No. 10/665,899, filed Sep. 18, 2003, and mailed from the USPTO dated Sep. 14, 2009, 14 pgs.
Non-Final Office Action for U.S. Appl. No. 10/665,899, filed Sep. 18, 2003, and mailed from the USPTO dated Sep. 17, 2007, 11 pgs.
Non-Final Office Action for U.S. Appl. No. 11/149,909, filed Jun. 10, 2005, and mailed from the USPTO dated May 13, 2008, 14 pgs.
Non-Final Office Action for U.S. Appl. No. 11/149,909, filed Jun. 10, 2005, and mailed from the USPTO dated May 6, 2009, 6 pgs.
Non-Final Office Action for U.S. Appl. No. 11/414,939, filed May 1, 2006, and mailed from the USPTO dated Jul. 19, 2010, 7 pgs.
Non-Final Office Action for U.S. Appl. No. 11/414,939, filed May 1, 2006, and mailed from the USPTO dated Mar. 9, 2010, 11 pgs.
Non-Final Office Action for U.S. Appl. No. 11/442,821, filed May 30, 2006, and mailed from the USPTO dated Jun. 1, 2011, 23 pgs.
Non-Final Office Action for U.S. Appl. No. 11/442,821, filed May 30, 2006, and mailed from the USPTO dated Nov. 12, 2009, 19 pgs.
Non-Final Office Action for U.S. Appl. No. 11/442,821, filed May 30, 2006, and mailed from the USPTO dated Sep. 3, 2008, 14 pgs.
Non-Final Office Action for U.S. Appl. No. 11/446,011, filed Jun. 2, 2006, and mailed from the USPTO dated Mar. 1, 2011, 15 pgs.
Non-Final Office Action for U.S. Appl. No. 11/446,011, filed Jun. 2, 2006, and mailed from the USPTO dated Nov. 27, 2009, 14 pgs.
Non-Final Office Action for U.S. Appl. No. 11/524,602, filed Sep. 21, 2006, and mailed from the USPTO dated Dec. 11, 2009, 20 pgs.
Non-Final Office Action for U.S. Appl. No. 11/524,602, filed Sep. 21, 2006, and mailed from the USPTO dated Nov. 14, 2011, 19 pgs.
Non-Final Office Action for U.S. Appl. No. 11/525,009, filed Sep. 21, 2006, and mailed from the USPTO dated Aug. 10, 2011, 18 pgs.
Non-Final Office Action for U.S. Appl. No. 11/525,009, filed Sep. 21, 2006, and mailed from the USPTO dated Dec. 16, 2009, 20 pgs.
Non-Final Office Action for U.S. Appl. No. 12/243,852, filed Oct. 1, 2008, and mailed from the USPTO dated Jan. 16, 2013, 5 pgs.
Non-Final Office Action for U.S. Appl. No. 12/243,852, filed Oct. 1, 2008, and mailed from the USPTO dated Mar. 17, 2011, 8 pgs.
Non-Final Office Action for U.S. Appl. No. 12/243,855, filed Oct. 1, 2008, and mailed from the USPTO dated Oct. 14, 2010, 6 pgs.
Non-Final Office Action for U.S. Appl. No. 12/243,861, filed Oct. 1, 2008, and mailed from the USPTO dated Nov. 8, 2010, 8 pgs.
Non-Final Office Action for U.S. Appl. No. 13/025,019, filed Feb. 10, 2011, and mailed from the USPTO dated Apr. 22, 2016, 16 pgs.
Non-Final Office Action for U.S. Appl. No. 13/025,019, filed Feb. 10, 2011, and mailed from the USPTO dated Apr. 5, 2013, 15 pgs.
Non-Final Office Action for U.S. Appl. No. 13/025,019, filed Feb. 10, 2011, and mailed from the USPTO dated Oct. 6, 2017, 17 pgs.
Non-Final Office Action for U.S. Appl. No. 13/025,019, filed Feb. 10, 2011, and mailed from the USPTO dated Sep. 18, 2014, 15 pgs.
Non-Final Office Action for U.S. Appl. No. 14/208,042, filed Mar. 13, 2014, and mailed from the USPTO dated Jun. 30, 2016, 23 pgs.
Non-Final Office Action for U.S. Appl. No. 14/208,042, filed Mar. 13, 2014, and mailed from the USPTO dated Sep. 20, 2017.
Non-Final Office Action for U.S. Appl. No. 14/208,042, filed Mar. 13, 2014, and mailed from the USPTO dated Sep. 21, 2018.

(56) References Cited

OTHER PUBLICATIONS

Non-Final Office Action for U.S. Appl. No. 15/134,820, filed Apr. 21, 2016, and mailed from the USPTO dated Feb. 23, 2018.
Non-Final Office Action for U.S. Appl. No. 15/602,999, filed May 23, 2017, and mailed from the USPTO dated May 3, 2018.
Notice of Allowance and Fee(s) Due for U.S. Appl. No. 10/350,795, filed Jan. 24, 2003, and mailed from the USPTO dated May 7, 2012, 15 pgs.
Notice of Allowance and Fee(s) Due for U.S. Appl. No. 10/350,796, filed Jan. 24, 2003 and mailed from the USPTO dated Feb. 1, 2006, 5 pgs.
Notice of Allowance and Fee(s) Due for U.S. Appl. No. 10/350,810, filed Jan. 24, 2003, and mailed from the USPTO dated Apr. 14, 2008, 6 pgs.
Notice of Allowance and Fee(s) Due for U.S. Appl. No. 10/351,465, filed Jan. 24, 2003, and mailed from the USPTO dated Sep. 21, 2005, 4 pgs.
Notice of Allowance and Fee(s) Due for U.S. Appl. No. 10/351,606, filed Jan. 24, 2003, and mailed from the USPTO dated Apr. 4, 2006, 12 pgs.
Notice of Allowance and Fee(s) Due for U.S. Appl. No. 11/149,909, filed Jun. 10, 2005, and mailed from the USPTO dated Sep. 16, 2009, 7 pgs.
Notice of Allowance and Fee(s) Due for U.S. Appl. No. 11/414,939, filed May 1, 2006, and mailed from the USPTO dated Nov. 2, 2010, pgs.
Notice of Allowance and Fee(s) Due for U.S. Appl. No. 11/442,821, filed May 30, 2006, and mailed from the USPTO dated Jul. 30, 2012, 6 pgs.
Notice of Allowance and Fee(s) Due for U.S. Appl. No. 11/446,011, filed Jun. 2, 2006, and mailed from the USPTO dated Aug. 9, 2011, 10 pgs.
Notice of Allowance and Fee(s) Due for U.S. Appl. No. 11/524,602, filed Sep. 21, 2006, and mailed from the USPTO dated Aug. 6, 2013, 22 pgs.
Notice of Allowance and Fee(s) Due for U.S. Appl. No. 11/525,009, filed Sep. 21, 2006, and mailed from the USPTO dated Jul. 23, 2012, 19 pgs.
Notice of Allowance and Fee(s) Due for U.S. Appl. No. 12/243,852, filed Oct. 1, 2008, and mailed from the USPTO dated Feb. 27, 2013, 6 pgs.
Notice of Allowance and Fee(s) Due for U.S. Appl. No. 12/243,855, filed Oct. 1, 2008, and mailed from the USPTO dated Nov. 22, 2010, 8 pgs.
Notice of Allowance and Fee(s) Due for U.S. Appl. No. 12/243,855, filed Oct. 1, 2008, and mailed from the USPTO dated Oct. 28, 2010, 5 pgs.
Notice of Allowance and Fee(s) Due for U.S. Appl. No. 12/243,861, filed Oct. 1, 2008, and mailed from the USPTO dated Sep. 6, 2011, 10 pgs.
Notice of Non-compliant Amendment dated Dec. 12, 2006 in U.S. Appl. No. 10/350,810.
Permissions in the Java ™ 2 SDK, printed Mar. 6, 2010, 45 pgs.
Restriction Requirement for U.S. Appl. No. 12/243,852, filed Oct. 1, 2008, and mailed from the USPTO dated Dec. 7, 2010.
Strebe, Matthew et al. MCSE: NT Server 4 Study Guide, Third Edition. 2000, SYBEX Inc. Front matter, pp. 284-293, and 308-347 are included. Entire book cited, 36 pgs.
Supplemental Notice of Allowability for U.S. Appl. No. 12/243,852, filed Oct. 1, 2008, and mailed from the USPTO dated Mar. 19, 2013, 3 pgs.
Trademark Electronic Search System record for Serial No. 76375405, Word Mark "Nitra".
Lee, Adam J. et al., "Searching for Open Windows and Unlocked Doors: Port Scanning in Large-Scale Commodity Clusters," Cluster Computing and the Grid, 2005. CCGrid 2005. IEEE International Symposium on vol. 1; Publication Year: 2005,, pp. 146-151 vol. 1.
Final Office Action for U.S. Appl. No. 14/208,042, filed Mar. 13, 2014, and mailed from the USPTO dated Jan. 11, 2019 , 16 pgs.
Advisory Action for U.S. Appl. No. 15/602,999, filed May 23, 2017, and mailed from the USPTO dated Jan. 31, 2019, 3 pgs.
Non-Final Office Action for U.S. Appl. No. 15/134,779, filed Apr. 21, 2016, and mailed from the USPTO dated Jan. 30, 2019, 26 pgs.
U.S. Appl. No. 15/134,820, Notice of Allowance, dated Jan. 28, 2019, 7 pages.
U.S. Appl. No. 15/602,999, Notice of Allowance, dated Apr. 18, 2019, 6 pages.
"Openbay Announces First-of-its-Kind Connected Car Repair Service", openbay.com, Mar. 31, 2015, 14 pages.
U.S. Appl. No. 15/134,779, Final Office Action, dated May 17, 2019, 25 pages.
Chatterjee, et al., "On-board diagnostics not just for racing anymore", EDN.com, May 6, 2013, 7 pages.
Drawbaugh, "Automatic Link Review: an expensive way to learn better driving habits", Endgadget.com, Nov. 26, 2013, 14 pages.
Jenkins, "Real-time vehicle performance monitoring with data intergrity", A Thesis Submitted to the Faculty of Mississippi State University, Oct. 2006, 57 pages.
Lavrinc, "First Android-powered infotainment system coming to 2012 Saab 9-3", Autoblog.com, Mar. 2, 2011, 8 pages.
Needham, "Google Now Taking Appointments for Auto Repair Shops", Autoshopsolutions.corn, Aug. 25, 2015, 6 pages.
Openbay.com Web Pages, Openbay.com, retrieved from archive.org May 14, 2019, Apr. 2015, 6 pages.
Openbay.com Web Pages, Openbay.com, retrieved from archive.org on May 14, 2019, Feb. 2014, 2 pages.
Openbay.com Web Pages, Openbay.com, retrieved from archive.org, May 14, 2019, Mar. 2015, 11 pages.
Phelan, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Warren, "This Device Determines What Ails Your Car and Finds a Repair Shop—Automatically", CarAndDriver.com, Apr. 8, 2015, 7 pages.
You, et al., "Overview of Remote Diagnosis and Maintenance for Automotive Systems", 2005 SAE World Congress, Apr. 11-14, 2015, 10 pages.
U.S. Appl. No. 15/134,779, Advisory Action, dated Jul. 29, 2019, 6 pages.
U.S. Appl. No. 13/025,019, Notice of Allowance, dated Sep. 26, 2019, 9 pages.
U.S. Appl. No. 15/478,042, Non-Final Office Action, dated Oct. 10, 2019, 26 pages.
U.S. Appl. No. 15/478,048, Non-Final Office Action, dated Sep. 30, 2019, 30 pages.
U.S. Appl. No. 15/134,779, Non-Final Office Action, dated Nov. 19, 2019, 27 pages.
U.S. Appl. No. 16/041,552, Non-Final Office Action, dated Dec. 27, 2019, 13 pages.
U.S. Appl. No. 15/478,042 , Non-Final Office Action, dated Aug. 4, 2020, 42 pages.
U.S. Appl. No. 15/134,779, Final Office Action, dated Feb. 27, 2020, 18 pages.
U.S. Appl. No. 15/478,042, Final Office Action, dated Mar. 19, 2020, 35 pages.
U.S. Appl. No. 16/041,552, Final Office Action, dated May 29, 2020, 18 pages.
U.S. Appl. No. 14/208,042 , Non-Final Office Action, dated Aug. 21, 2020, 13 pages.
U.S. Appl. No. 15/134,779 , Notice of Allowance, dated Sep. 9, 2020, 12 pages.
U.S. Appl. No. 15/478,048 , Final Office Action, dated Apr. 9, 2020, 42 pages.
U.S. Appl. No. 16/041,552 , Non-Final Office Action, dated Sep. 17, 2020, 16 pages.

* cited by examiner

Receiving, Via A Network Interface Of A Computing Device, A Diagnostic Trouble Code (DTC) From A Vehicle
652

Interpreting, Via The Computing Device, A Service Operation That Resolves The DTC
654

Querying, Via The Network Interface, A Plurality Of Service Centers To Determine Available Appointments To Perform The Service Operation
656

Receiving, Via The Network Interface, At Least One Potential Service Appointment With A Service Center From The Plurality Of Service Centers
658

Scheduling A Potential Service Appointment From The At Least One Potential Service Appointment Based On A Customer's Selection
560

FIG. 6

AUTOMATIC AUTOMOBILE REPAIR SERVICE SCHEDULING BASED ON DIAGNOSTIC TROUBLE CODES AND SERVICE CENTER ATTRIBUTES

TECHNICAL FIELD

This application relates to systems and methods for service operation mapping.

SUMMARY

The present disclosure provides systems and methods for mapping a service appointment to an automobile. Mapping a service appointment to an automobile can include receiving, via a network interface, a diagnostic trouble code (DTC) from the automobile, interpreting, via a computing device, a service operation that resolves the DTC, and updating, via the computing device, the plurality of attributes of the plurality of service centers. Mapping the service appointment to an automobile can also include mapping, via the computing device, the service operation to a selected service center from the plurality of service centers based on the plurality of attributes of the selected service center and scheduling an appointment with the service center.

In another example, mapping the service appointment to an automobile can also include receiving, via a network interface, the DTC from the automobile, interpreting, via a computing device, a service operation that resolves the DTC and accessing, via the computing device, a plurality of operation attributes of the service operation. Mapping the service appointment to an automobile can also include updating, via the computing device, the plurality of center attributes of the plurality of service centers, mapping, via the computing device, the plurality of operation attributes to at least a subset of the plurality of service center attributes, and identifying a service center from the plurality of service centers that correspond to at least the subset of the plurality of service centers. Mapping the service appointment to the automobile can also include scheduling an appointment with the service center.

In yet another example, mapping the service appointment to an automobile can include receiving, at a dealership via a network interface, a diagnostic trouble code (DTC) from the automobile, interpreting, via the computing device, a service operation that resolves the DTC and accessing a plurality of operation attributes of the service operation. Mapping the service appointment to an automobile can also include mapping the plurality of operation attributes to a plurality of dealership attributes of the dealership, identifying at least a service bay, a mechanic, and a time slot that correspond to the plurality of dealership attributes and scheduling an appointment for the automobile to perform the service operation.

BRIEF DESCRIPTION OF THE DRAWINGS

FIG. 6 is a flowchart of a method for scheduling a service appointment according to one embodiment.

DETAILED DESCRIPTION OF PREFERRED EMBODIMENTS

Figure 1:
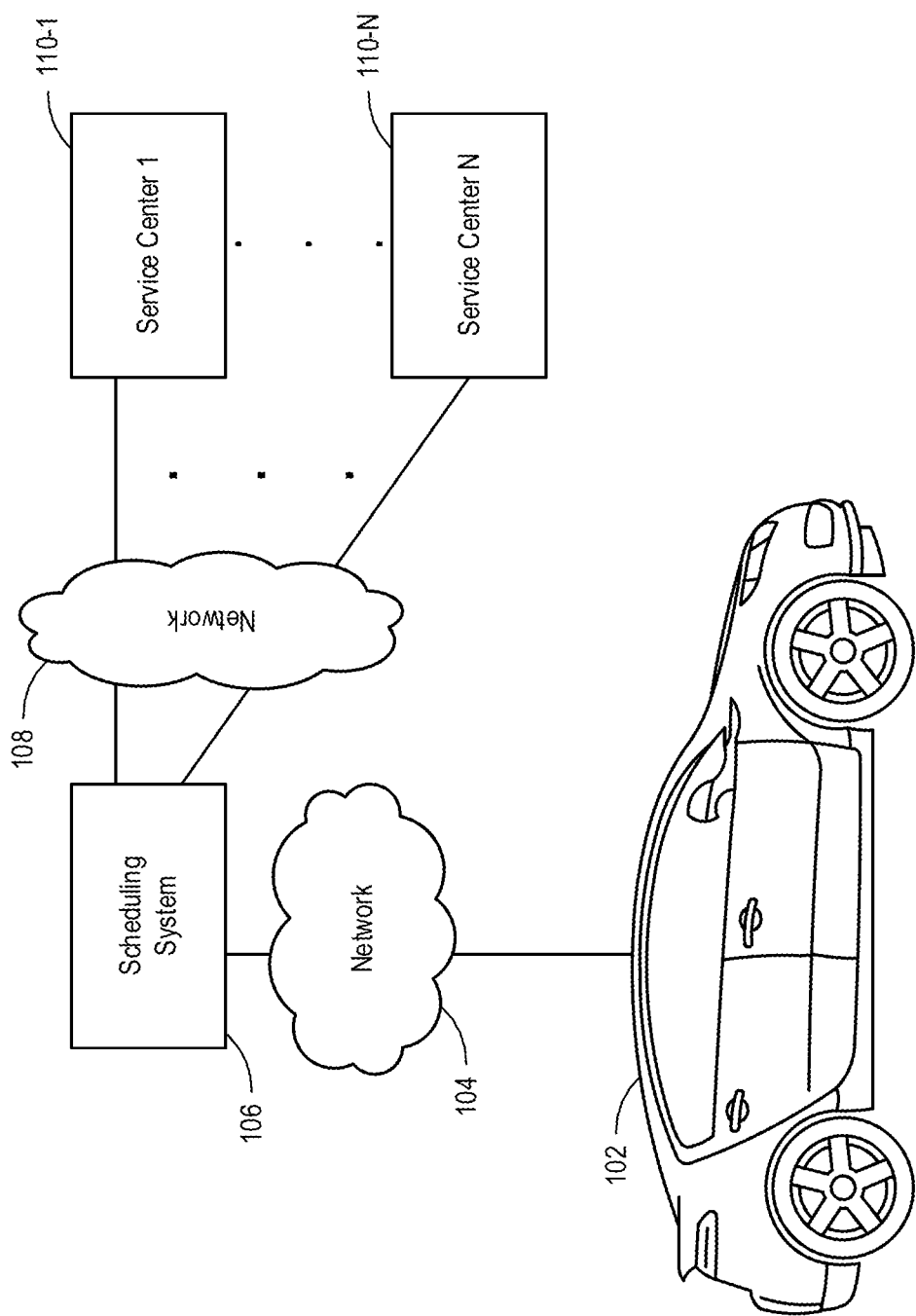
FIG. 1 is a system diagram of a scheduling system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Original equipment manufacturers (OEM) produced vehicles have built in diagnostic tools. The official diagnostic tools can include on-board diagnostics (OBD) systems. The diagnostic tools can determine if a service is needed. For example, the diagnostic tools can activate an engine light on an instrument panel to inform a user that a service is needed. Diagnostic tools can produce a diagnostic trouble code (DTC) based on a determination that a service is needed. The DTC can consist of a unique code and/or description that describes a reported abnormality in an automobile. The reported abnormalities are reported based on a sensor within the automobile that takes a measurement that is outside the norm. As such, the DTC can register that a service is needed without identifying the particular service that is needed.

In a number of previous approaches, a customer may present the automobile to a technician at a service center. The technician may connect a computer to the automobile via an OBD port to read the DTC. The technician would then have to inspect the automobile to determine the particular service that is needed to resolve the DTC. The technician may be unable to schedule an appointment to perform the particular service for a number of reasons. For example, the technician may not have access to a part needed to perform the particular service and/or the technician may not have available mechanics that can perform the service, among other possible reasons for being unable to schedule the appointment. In such a case, the client would have to consult a different technician at a different service center to begin the process anew. Thus, reducing the efficiency in resolving the DTC due to the constraints of having to present the automobile to a technician before a determination of whether a particular service can be made at a particular service center.

In a number of examples, the particular service needed to resolve the DTC can be determined without presenting the automobile to a technician to increase the efficiency to resolving the DTC. For example, a scheduling system can receive the DTC from an automobile and can determine a particular service, to perform on the automobile, that can resolve the DTC. The scheduling system can then determine the available service centers that have available appointments to resolve the DTC. The scheduling system can schedule the available appointment to perform the particular service on the vehicle. Determining the particular service can include mapping a DTC code to at least a particular service and mapping the particular service to a service center. The present approach can schedule a service appointment without user input. The present approach can increase efficiency in scheduling a service appointment.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. The network may include a wireless network. For example, an unmanned aerial vehicle (UAV) may be connected to the World Wide Web via a wireless network such as a cellular network and/or a WiFi network.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, or other protocols over twisted pair, coaxial, or optical fiber cables, telephone lines, radio waves, satellites, microwave relays, modulated AC power lines, physical media transfer, and/or other data transmission "wires" and/or wireless protocols known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, a SoC, a SiP, an FPGA, a PAL, a PLA, an FPLA, a PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device (s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general-purpose computers, computer programming tools and techniques, computer networks and networking technologies, digital storage media, authentication; access control, and other security tools and techniques provided by public keys, encryption, firewalls, and/or other means.

FIG. 1 is a system diagram of a scheduling system according to one embodiment. FIG. 1 includes an automobile 102, a network 104, a scheduling system 106, a network 108, and service centers 110-1 to 110-N (referred to as service centers 110).

Although FIG. 1 illustrates an automobile 102, a different type of vehicle can be implemented herein. For example, an automobile 102 can represent a motorcycle, a boat, and/or a different type of vehicle. As used herein, the term automobile represents any type of vehicle.

The networks 104 and 108 can be a same network or different networks. For example, the scheduling system can employ an intranet as the network 104 or 108 to communicate with the service centers 110 and/or an internet as the network 104 or 108 to communicate with the service centers 110.

The service centers 110 can provide services to automobiles including the automobile 102. The service centers 110 can be independently owned service centers, service centers that are part of a chain of service centers, and/or service centers of a dealership, among other types of service centers.

Each of the service centers 110 can schedule appointments to perform service operations on a vehicle 102. The service centers 110 can schedule appointments based on a service operation needed, the labor and skill needed to perform the service operation, the parts needed to perform the operation, and/or service bays available to perform the operation, among other data that can be used by the service centers 110 to schedule appointments. The service center may provide a number of available appointments to a scheduling system 106 when all or a portion of the above limitations is available. For example, the service center may inform the scheduling system 106 of an available appointment if a mechanic has the time (labor) and the skill to perform the service operation, the parts needed to perform the operation are available, and/or a service bay is available to host the service operation. An available appointment may be defined by other standards and/or limitations of a service center. For example, a some service centers from the service centers 110 may define an appointment by considering if a mechanic has the time to perform the service operation without considering the skill of the mechanic.

The scheduling system 106 can include a plurality of computing devices configured to schedule appointments for the automobile 102. For example, the scheduling system 106 can include a first computing device for mapping a DTC to a service operation to be performed on the automobile 102 and a second computing device to map the service operation to an appointment for a service center from service centers 110.

Each of the computing devices of a scheduling system 106 can include one or more processors, electronic memory, and/or a network interface, among other components used by the computing device. The electronic memory is accessible by the one or more processors. The electronic memory can store the DTC of the automobile 102, a plurality of attributes of a plurality of service centers, and/or a scheduling application, among other data that can be used to schedule a service appointment. A network interface may be enabled to provide communication with the automobile 102. At least one of the computing device may include a scheduling application stored in the electronic memory and configured by the one or more processors, to schedule a service appointment for the automobile 102.

In one example, the automobile 102 can experience an event that can lead to a DTC. The event can be a failure event, a warning event, and/or a notice event, among other types of events. A failure event can be a failure of a system of the automobile 102. For example, the failure event can be a failure of the transmission, a failure of the cooling system, and/or a failure of the pistons in an engine, among other types of failures that an automobile can experience. A warning event can provide a warning to a user of the automobile 102 that the readings from a sensor of the automobile 102 are beginning to experience readings outside the norm. For example, a warning event can occur if the pressure of a tire of the automobile 102 is below a recommended pressure. A notice event can provide a notice to a user of the automobile 102 that an action is needed. For example, a notice event can notify the user of the automobile 102 that an oil change is due, among other types of notice events.

The automobile can communicate with the scheduling system 106 via a network 104. The automobile can communicate with the scheduling system 106 to request a service appointment with one of the service centers 110. The request can include the DTC and information pertaining to the automobile 102 that may be useful in scheduling a service appointment.

The scheduling system 106 can determine which of the service centers 110 have available appointments to provide a service operation to the automobile 102. The scheduling system 106 can schedule an appointment from the available appointments and/or provide the available appointments to the automobile 102.

The automobile 102 can present the available appointments to the user of the automobile 102 and relevant information. The relevant information can include an appointment time, an appointment location, a service center from the service centers 110 where the appointment will be performed, the mechanic who will perform the service operation and/or a price for performing the service operation, among other relevant information. The user can select a service appointment from the presented service appointments and/or request additional service appointments.

The scheduling system 106 can schedule the appointment with one of the service centers 110 and inform the vehicle/user that the service appointment has been scheduled.

Figure 2:
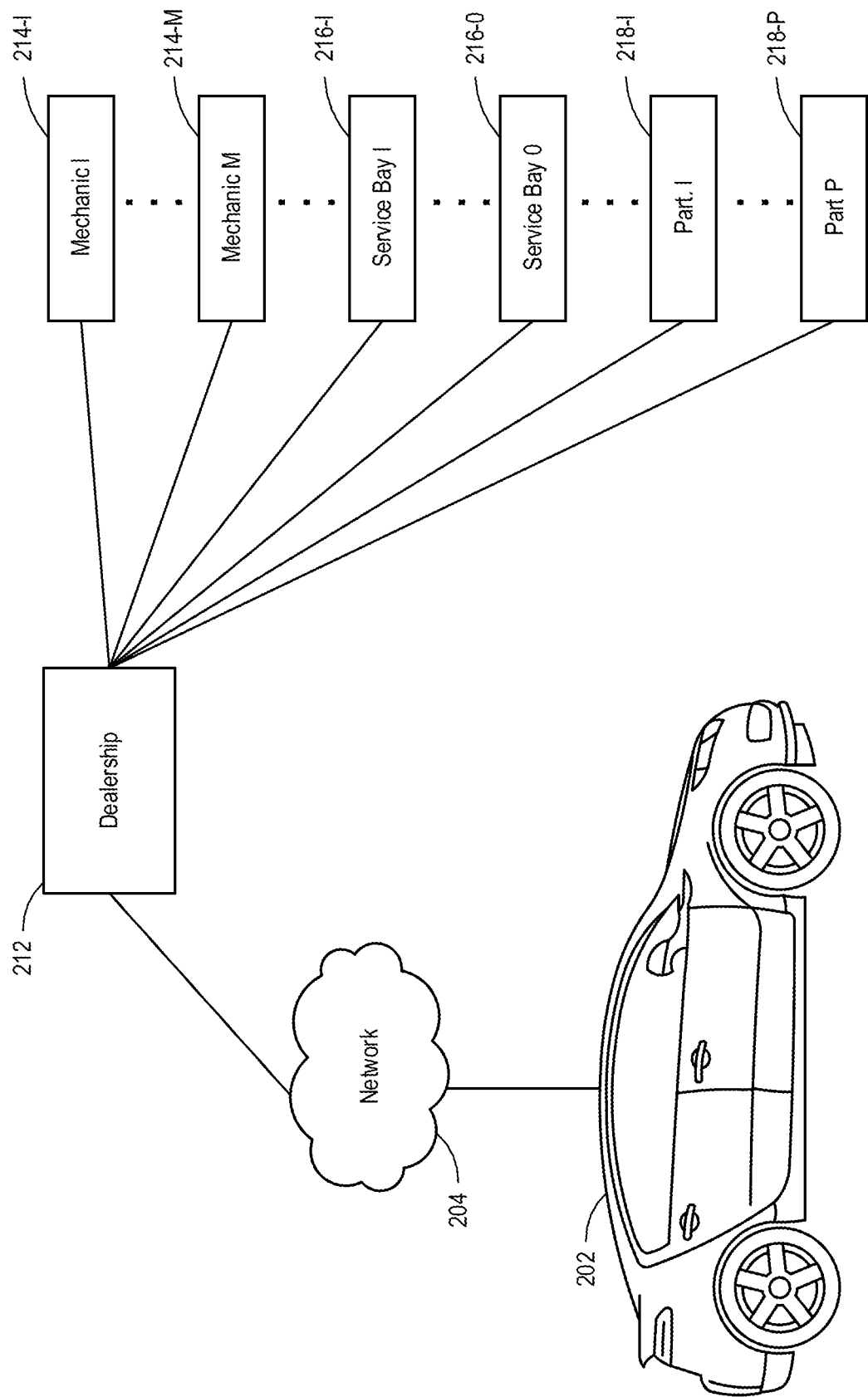
FIG. 2 is a system diagram of a scheduling system according to one embodiment.

FIG. 2 is a system diagram of a scheduling system according to one embodiment. FIG. 2 includes an automobile 202 and a network 204 that are analogous to the automobile 102 and the network 104 in FIG. 1. FIG. 2 also includes a dealership 212, mechanics 214-1 to 214-M (referred to generally as mechanics 214), service bays 216-1 to 216-O (referred to generally as service bays 216), and/or parts 218-1 to 218-P (referred to generally as parts 218).

The dealership 212 differs from a service center (e.g., service center 110-1 in FIG. 1) in that a dealership 212 may schedule appointments for multiple service centers that are managed by the dealership 212. As such, a dealership 212 may schedule service appointments at a plurality of locations. In some examples, a dealership 212 may provide services to the automobile of a particular make and/or a plurality of makes.

The dealership 212 can include a plurality of computing devices configured to schedule appointments for the automobile 202. For example, the dealership 212 can include a first computing device for mapping a DTC to a service operation to be performed on the automobile 202 and a second computing device to map the service operation to an appointment.

Each of the computing devices of a dealership 212 can include one or more processors, electronic memory, and/or a network interface, among other components used by the computing device. The electronic memory is accessible by the one or more processors. The electronic memory can store the DTC of an automobile, a plurality of attributes of the mechanics 214, the service bays 216, the parts 218, and/or a scheduling application, among other data that can be used to schedule a service appointment. A network interface may be enabled to provide communication with the automobile 202. At least one of the computing device may include a scheduling application stored in the electronic memory and configured, by the one or more processors, to schedule a service appointment for the automobile 202.

The mechanics 214 can be employees of the dealership 212 and may work in a plurality of different sites or in a single site. The service bays 216 may be located in a plurality of different sites or at a single site. The parts 218 may be comprised of an inventory of the dealership 212.

The automobile 202 may schedule an appointment directly with the dealership 212 instead of going through an independent scheduling system 106 as shown in FIG. 1.

Figure 3:
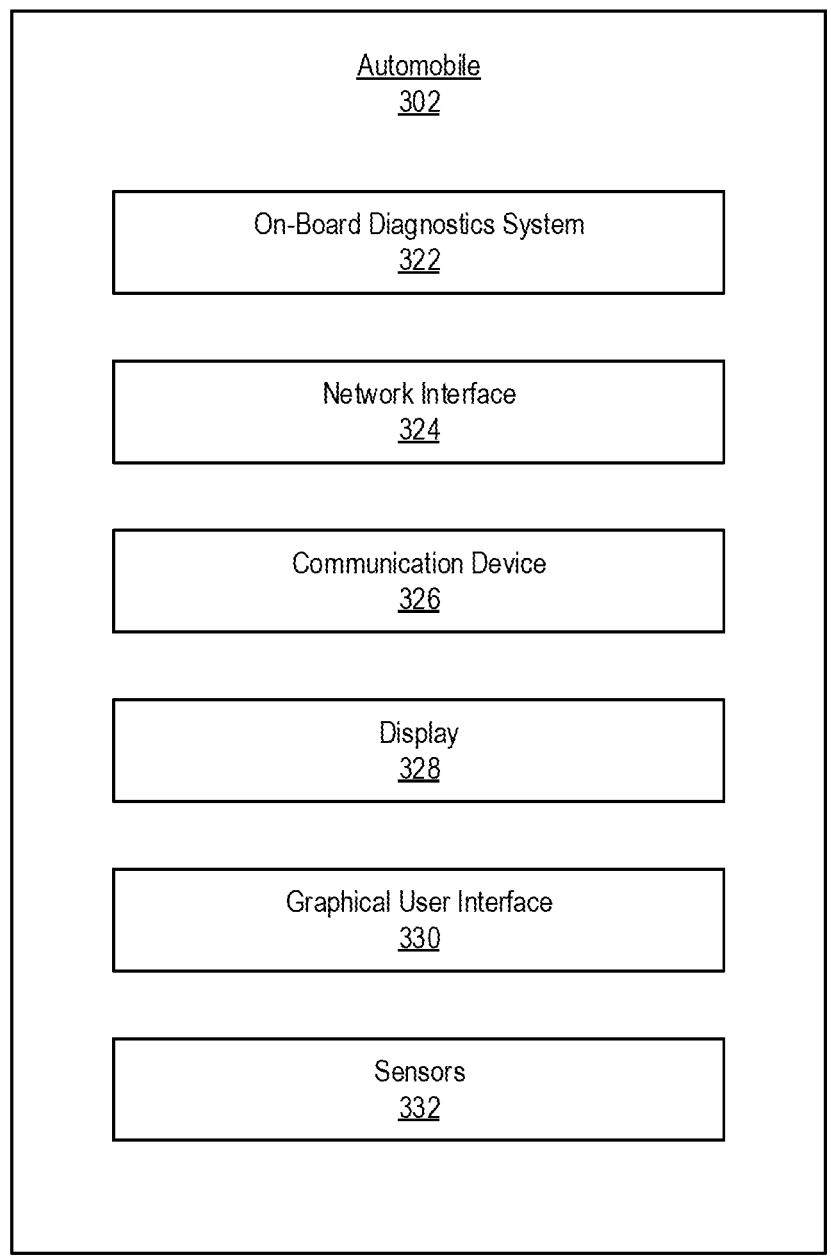
FIG. 3 is a block diagram of an automobile according to one embodiment.

FIG. 3 is a block diagram of an automobile according to one embodiment. The automobile 302 includes at least an OBD system 322, a network interface 324, a communication device 326, a display 328, a graphical user interface 330, and a plurality of sensors 332.

As described above, the OBD system 322 can diagnose a problem/abnormality with an automobile. The OBD system 322 includes hardware and/or computer readable instructions. The on-board diagnostic system can produce a DTC. The DTC can be stored in an electronic memory of the automobile 302 and/or in an electronic memory of the communication device 326.

The network interface 324 can include hardware and/or computer readable instructions to communicate with a scheduling system. The network interface can include an antenna for wireless communications. The network interface can receive data and send data via a network (e.g., networks 104, 108, and 204 in FIGS. 1 and 2). The network interface can provide communication to the communication device 326. The network interface can send communication from the communication device 326.

The communication device 326 includes hardware and/or computer readable instructions to schedule a service appointment for the automobile 302. The communication device 326 is further described in FIG. 4.

The display 328 can include hardware and/or computer readable instructions to display data to a user of the vehicle 302. The display 328 can be a touch display that receives user interactions via a tactile interface. As such, the communication device 326 can display data to a user via a display 328 and can receive user input via the display 328.

The graphical user interface 330 can include hardware and/or computer readable instructions to provide and/or receive data to and/or from a user of the automobile 302. The some examples, the graphical user interface 330 can be a graphical user interface 330 to the communication device 326 which can be displayed on and/or be a part of the display 328.

The sensors 332 can include a plurality of sensors that provide data on the automobile's 302 function. The sensors 332 can be sensors that are a part of the OBD system 322 and/or sensors 332 that are not a part of the OBD system 322. The sensors 332 can provide data on the function of a plurality of systems of the automobile 302. The sensors 332 can monitor the actions taken by the vehicle. For example, the sensors 332 can monitor a vehicle's speed and/or the revolutions per minute (RPM) of the automobile 302, among other actions taken by the vehicle. The data provided by the sensors 332 can be used to map a DTC to a service operation. That is, the data provided by the sensors 332 can be used to select a service operation to perform to resolve the DTC.

Figure 4:
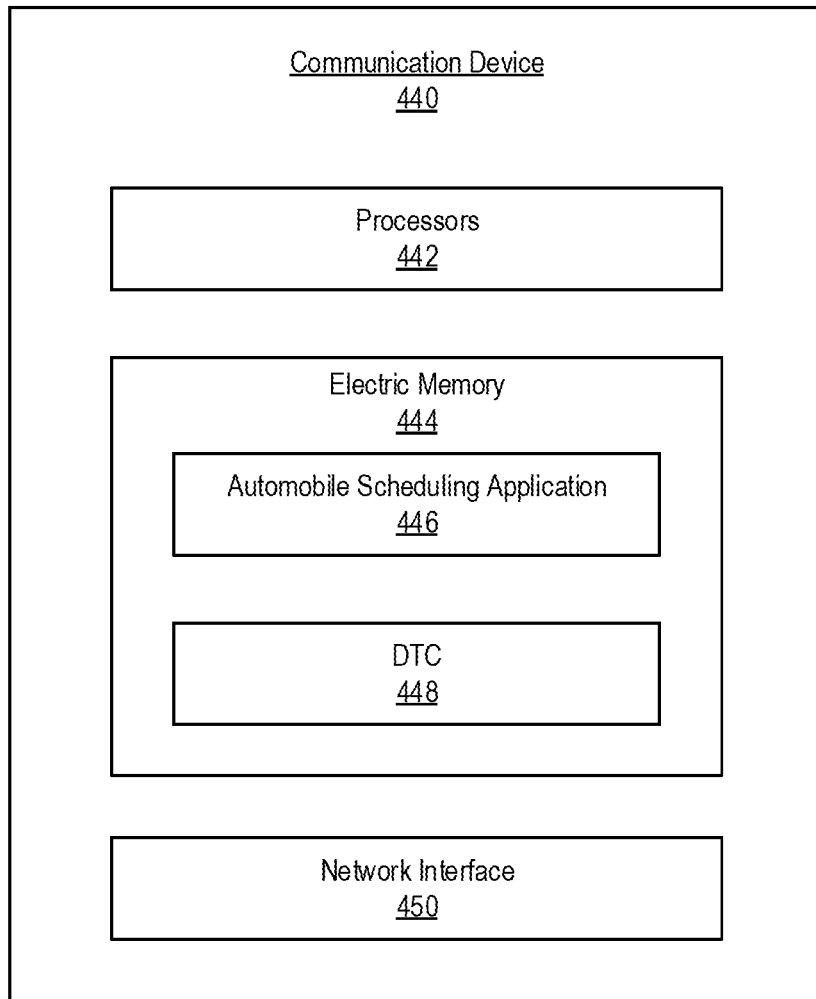
FIG. 4 is a block diagram of a communication device according to one embodiment.

FIG. 4 is a block diagram of a communication device according to one embodiment. The communication device 440 includes one or more processors 442, electronic memory 444, and a network interface 450. The electronic memory 444 includes an automobile scheduling application 446 and a DTC 448.

The one or more processors 442 can be independent of any other processors that are a part of the automobile (e.g., automobile 302 in FIG. 3). The network interface 450 can be independent of network interface 324 in FIG. 3. In a number of examples, the network interface 450 can be analogous to network interface 324 in FIG. 3. The network interface 450 enables communication with one or more computing devices including a computing device of the scheduling system (e.g., scheduling system 106 in FIG. 1). The network interface 450 may be configured to connect to the Internet (e.g., the World Wide Web) via a WiFi connection and/or a cellular connection, among other connection types.

The DTC 448 can be created by the OBD system 322 and stored in the electronic memory 444 by the OBD system 322 in FIG. 3. The automobile scheduling application 446 can be executed by the processors 442 to schedule a service operation to resolve the DTC 448. That is, the electronic memory is accessible by the one or more processors.

The automobile scheduling application 446 can be configured to read the DTC stored in the electronic memory. The automobile scheduling application 446 can also be configured to provide, via the network interface 450, the DTC to the scheduling system. The automobile scheduling application 446 can receive a potential service appointment with a service center to resolve the DTC. The automobile scheduling application 446 can acknowledge the potential service appointment to schedule the potential service appointment with the service center. That is, the automobile scheduling application 446 can accept the potential service appointment and inform the scheduling system accordingly.

In a number of examples, the service appointment can be scheduled without a customer's (e.g., user of the automobile) intervention. That is, the service appointment can be scheduled by the automobile, particularly by automobile scheduling application 446 in the communication device 440. The customer can be informed of the service appointment and the associated details after the service appointment has been scheduled.

In a number of examples, the customer can be presented with a plurality of potential service appointments. For example, the automobile scheduling application 446 may present one or more potential service appointments via a graphical user interface (e.g., graphical user interface 330 in FIG. 3) on a display (e.g., display 328 in FIG. 3) to a customer. The customer can then schedule a service appointment from a plurality of potential service appointments via the scheduling system. For example, the automobile scheduling application 446 may receive, via the user interface (e.g., graphical user interface 330 in FIG. 3), a customer's selection of one of the potential service appointments. The graphical user interface can be implemented via a display (e.g., display 328 in FIG. 3) of the vehicle.

In some embodiments, the communication device can be integrated into the automobile. That is, the communication device can be permanently coupled to the automobile. For example, the communication device may be an original equipment manufacturer (OEM) part of the automobile.

The communication device can also be a mobile communication device that can be coupled to the automobile via a WiFi connection. That is, the communication device can communicate with the automobile via the WiFi connection. In some embodiments, the communication device can be coupled to the automobile via an OBD port. As such, a user of the automobile may be able to plug the communication device 440 to the automobile and unplug the communication device 440 from the automobile.

Figure 5:
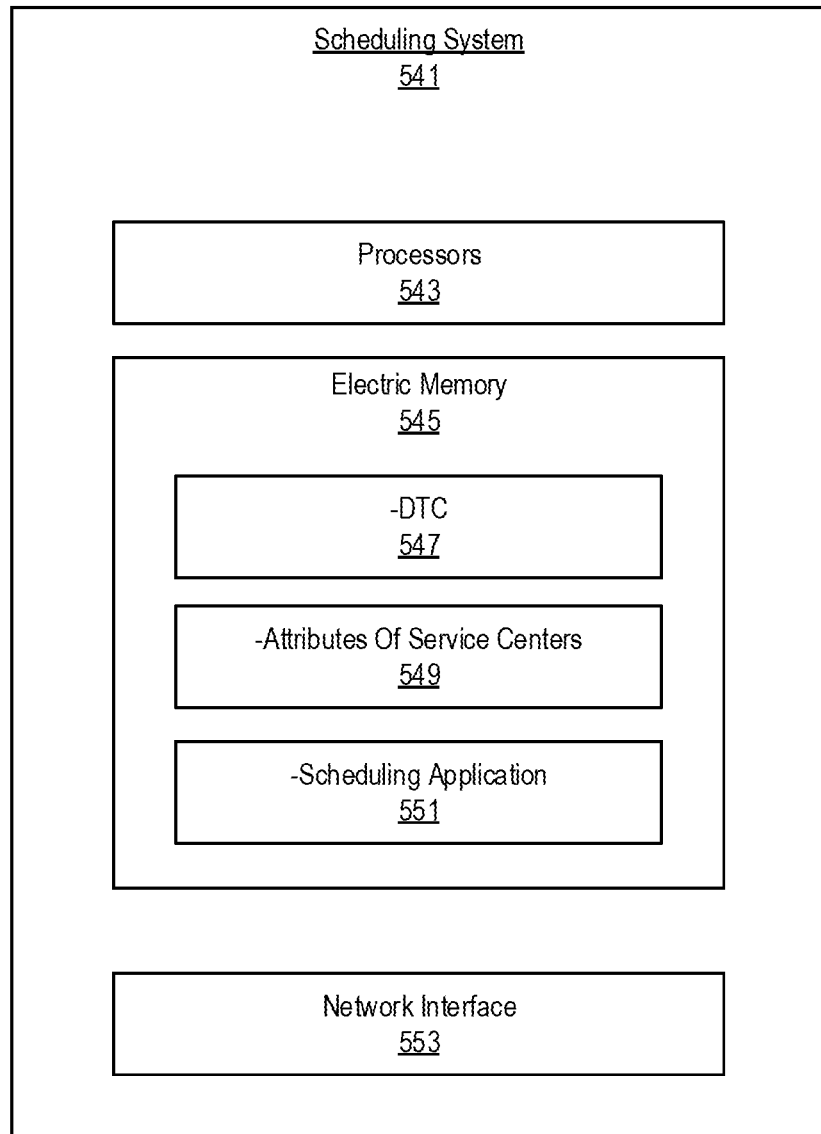
FIG. 5 is a block diagram of a scheduling system according to one embodiment.

FIG. 5 is a block diagram of a scheduling system according to one embodiment. The scheduling system 541 is analogous to scheduling system 106 in FIG. 1. The scheduling system 541 can include a plurality of computing devices each of which may include one or more processors 543, electronic memory 545, and a network interface 553. The electronic memory may store a DTC 547, attributes of service centers 549, and a scheduling application 551.

Although FIG. 5 shows attributes of service centers 549, it is to be understood that attributes of a dealership can be substituted in its place. That is, the scheduling system 541 has the ability to interact with different service center appointment systems and/or dealership appointment systems.

The scheduling application 551 can receive, via the network interface, the DTC from the automobile. The scheduling application 551 can store the DTC in the electronic memory 545. The scheduling application 551 can interpret, via a computing device, a service operation that resolves the DTC. The scheduling application 551 can update, via the computing device, the plurality of attributes of the plurality of service centers and map, via the computing device, the service operation to a selected service center from the plurality of service centers based on the plurality of attributes of the selected service center. The scheduling application 551 can schedule an appointment with the service center.

The plurality of attributes of the plurality of service centers describe an ability of a respective service center from the plurality of service centers to perform the service operation. The plurality of attributes of the plurality of service centers include whether each of the plurality of service centers has a mechanic who is qualified to perform the service operation. The plurality of attributes of the plurality of service centers also include a next availability of the mechanic who is qualified to perform the service operation. As such, scheduling system 541 can determine whether a service center has a mechanic who is qualified to perform the service operation and who has time to perform the service operation.

In a number of examples, the scheduling system 541 can have access to an inventory of a plurality of service centers. For example, the plurality of attributes of the plurality of service centers include whether each of the plurality of service centers' inventory includes a part required to perform the service operation. In some examples, the scheduling system 541 has to query the service center whether the service center has a particular part without knowledge of the rest of the service center's inventory.

The scheduling system 541 can determine whether a particular service center has the particular part in stock. For example, the plurality of attributes of the plurality of service centers include a date of an expected arrival of the part required to perform the service operation based on a determination that a particular service center's inventory does not include the part. The scheduling system 541 may receive a service center's parts orders and/or the scheduling system 541 may query a service center to determine when the service center will next have the particular part in stock.

The plurality of attributes of the plurality of service centers may include a next availability of a service bay for each of the plurality of service centers. The scheduling system 541 may have access to the schedules of the service bays of the service centers and/or the scheduling system 541 may query the particular service center to identify a next available service bay.

The service center may compile a list of potential appointments to perform the service operation. Each potential appointment can be created if a service center has a mechanic who is qualified to perform the service operation and is available to perform the service operation at a same time that the particular part is available and/or the service bay is available to perform the service operation.

The service center may then present the potential appointments to the automobile and/or the user of the automobile. The service center may receive a confirmation of a selected potential appointment which the service center may schedule with the corresponding service center.

FIG. 6 is a flowchart of a method for scheduling a service appointment according to one embodiment. The method includes receiving 652, via a network interface of a computing device, a DTC from an automobile and interpreting 654, via the computing device, a service operation that resolves the DTC. The method also includes querying 656, via the network interface, a plurality of service centers to determine available appointments to perform the service operation and receiving 658, via the network interface, at least one potential service appointment with a service center from the plurality of service centers. The method further includes scheduling 660 a potential service appointment from the at least one potential service appointment based on a customer's selection.

In a number of examples, a location can be associated with the DTC. The location can be used to select service centers from which the potential appointments can be identified. For example, the method can further include receiving a location of the automobile and/or a home location of the automobile.

If a user of the automobile is on vacation for an extended period of time, then a service operation performed to resolve the DTC can be performed at a location near which the automobile is currently located. In a number of examples, a user of the automobile may select a home location of the vehicle before performing the service operation, such that service centers near the home location of the vehicle are selected.

Although the location of the vehicle and/or the home location of the vehicle can be used to select service centers with which potential appointments can be complied; the service centers can be selected if the service centers' location is within a predetermined distance from the location of the vehicle and/or the home location of the vehicle. For example, service centers that are closer to a given location can be given priority over service centers that are farther away in presenting associated potential appointments to the vehicle/user. For example, the plurality of service centers can be selected to query based on a proximity of the plurality of service centers to a home location of the automobile.

Figure 7:
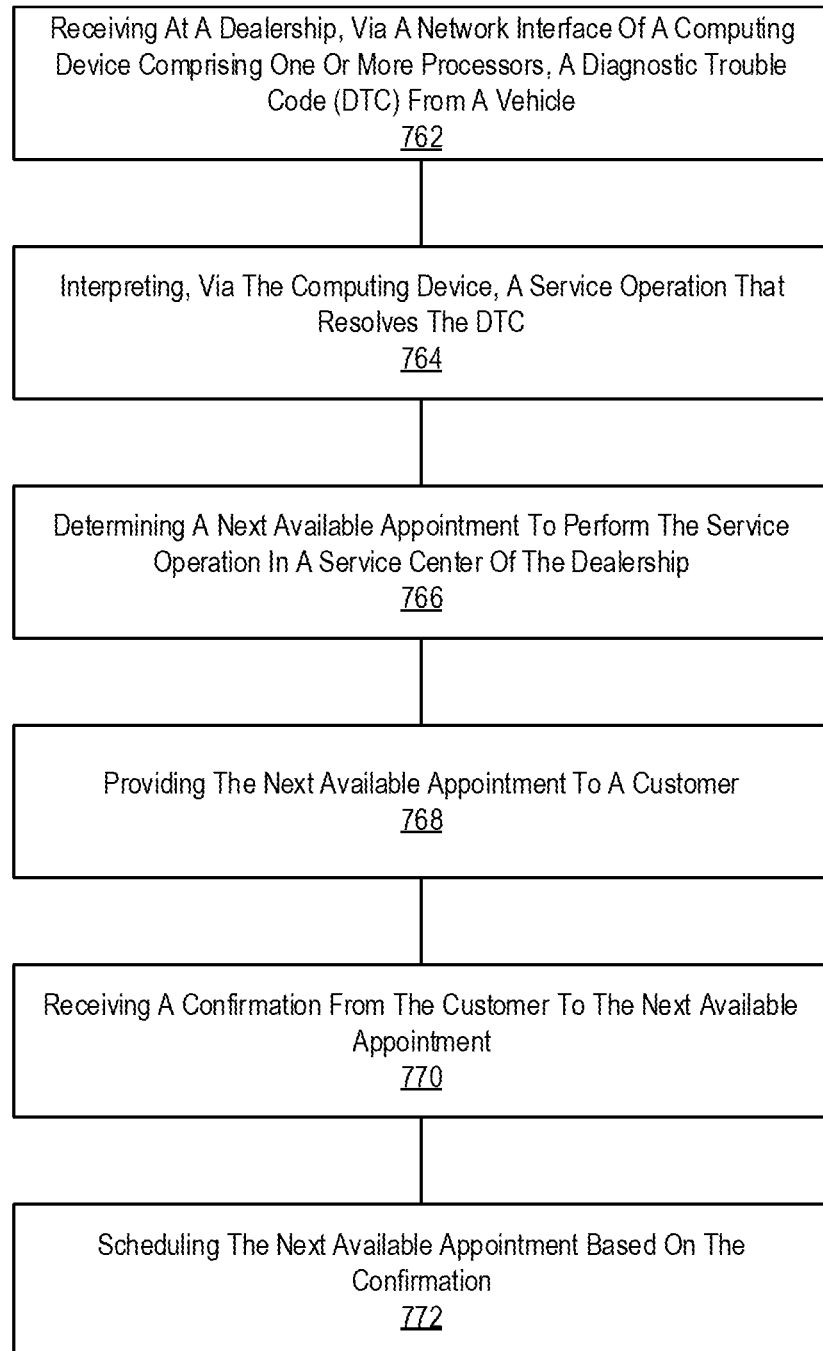
FIG. 7 is a flowchart of a method for scheduling a service appointment according to one embodiment.

FIG. 7 is a flowchart of a method for scheduling a service appointment according to one embodiment. As used herein, the method can be stored in a computer-readable storage medium that, when implemented by a computing device, can cause the computing device to perform the method.

The method can include receiving 762 at a dealership, via a network interface of a computing device comprising one or more processors, a DTC from an automobile and interpreting 764, via the computing device, a service operation that resolves the DTC. The method can also include determining 765 a next available appointment to perform the service operation in a service center of the dealership and providing 768 the next available appointment to a customer. The method can further include receiving 770 a confirmation from the customer of the next available appointment and scheduling 772 the next available appointment based on the confirmation.

Providing 768 the next available appointment to the customer can further include providing a cost of performing the service operation. A cost of performing the service operation may be of importance to a user of the automobile. The automobile scheduling application may be configured to schedule a potential appointment based on the cost of performing the service operation for the potential appointment.

Determining a service operation can include mapping a DTC to the particular service operation. To map the DTC to the particular service operation, more data than just the DTC may be needed. For example, data comprising a context associated with the DTC may be received at the dealership (e.g., and/or by the scheduling system). The context associated with the DTC may include at least one of a vehicle make, a vehicle model, driver information, and a plurality of measurements of the automobile taken at a time prior to the creation of the DTC, at the time of the creation of the DTC, and/or after the creation of the DTC. For example, a speed of the vehicle may be helpful in mapping the DTC to a particular service operation.

The service operation can be interpreted using the context associated with the DTC. For example, the service operation can be selected to resolve the DTC based on the context in which the DTC was created.

Figure 8:
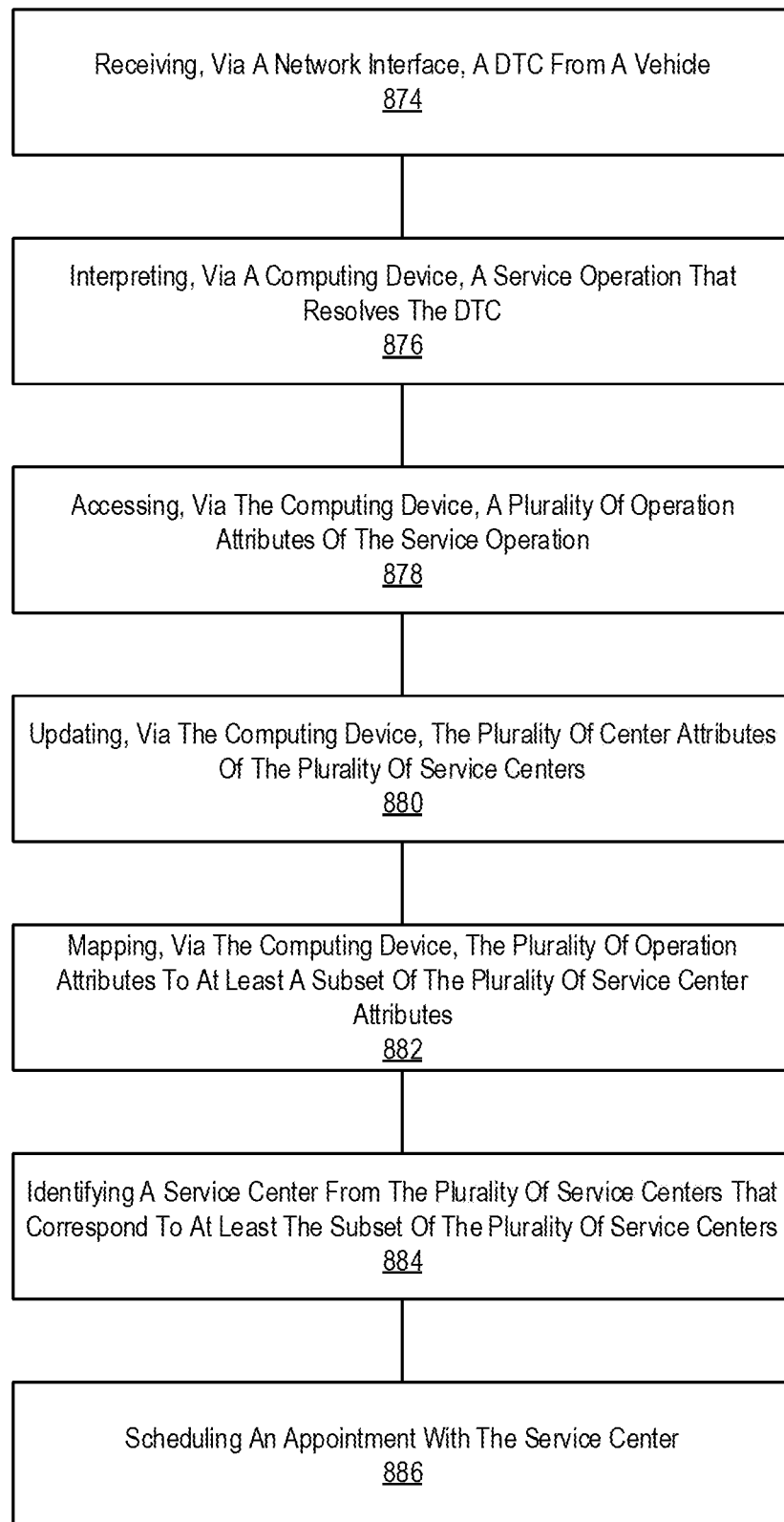
FIG. 8 is a flowchart of a method for scheduling a service appointment according to one embodiment.

FIG. 8 is a flowchart of a method for scheduling a service appointment according to one embodiment. The method can include receiving 874, via a network interface, the DTC from a vehicle and interpreting 876, via a computing device, a service operation that resolves the DTC. The method can also include accessing 878, via the computing device, a plurality of operation attributes of the service operation. The plurality of operation attributes may be objects and/or skills needed to perform the service operation.

The method can also include updating 880, via the computing device, the plurality of center attributes of the plurality of service centers and mapping 882, via the computing device, the plurality of operation attributes to at least a subset of the plurality of service center attributes. The method can further include identifying 884 a service center from the plurality of service centers that correspond to at least the subset of the plurality of service centers and scheduling 886 an appointment with the service center.

The plurality of operation attributes define requirements to perform the service operation. For example, replacing a tire may include having a replacement tire. The attributes may also include the skill needed to perform the service operation. The skill may be defined in terms of certificates, credentials, and/or accreditations, such as school diplomas and/or certificates of accreditation to perform labor on a specific vehicle make and/or a vehicle model.

The plurality of operation can also include a duration of time to perform the service operation. For example, a particular service operation can be performed in two hours and as such the duration of time to perform the service operation may be two hours. The plurality of operation attributes may include parts needed to perform the service operation. The parts may include replacement parts and/or tools used in performing the service operation. For example, a hydraulic lift may be needed to perform a particular operation.

The plurality of operation attributes can also include whether a service bay is required to perform the service operation. Some service operations may be performed without a service bay while other service operations may be performed using a service bay. Furthermore, service bays may be different and as such the service operation performed using a respective service bay may differ. The plurality of operation attributes may include attributes of service bays.

Figure 9:
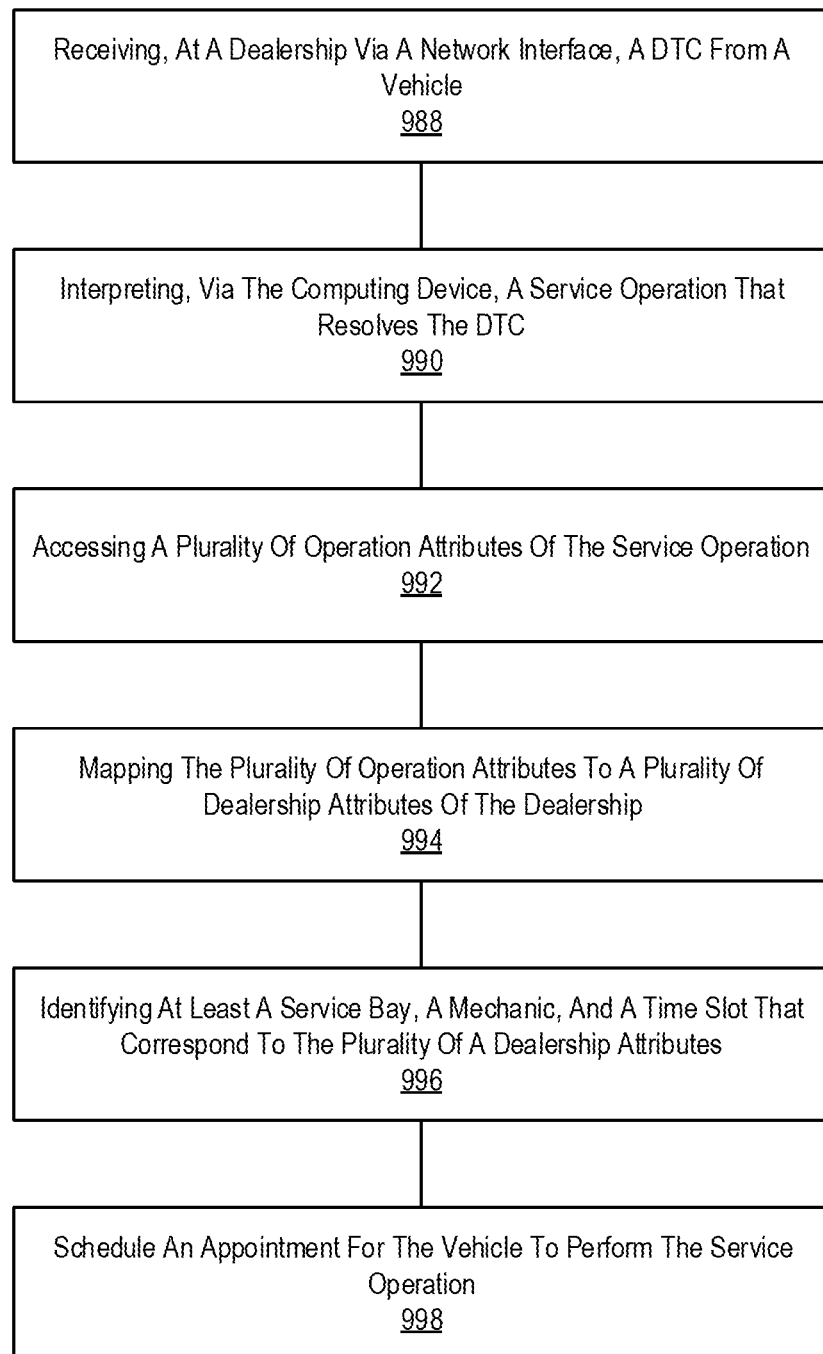
FIG. 9 is a flowchart of a method for scheduling a service appointment according to one embodiment.

FIG. 9 is a flowchart of a method for scheduling a service appointment according to one embodiment. The method can include receiving 988, at a dealership via a network interface, a DTC from a vehicle and interpreting 990, via the computing device, a service operation that resolves the DTC. The method can also include accessing 992 a plurality of operation attributes of the service operation and mapping 994 the plurality of operation attributes to a plurality of dealership attributes of the dealership. The method can also include identifying at least a service bay, a mechanic, and a time slot that correspond to the plurality of dealership attributes and scheduling 998 an appointment for the vehicle to perform the service operation.

The time slot can identify an unscheduled time for the mechanic. The time slot can also identify an unscheduled time for the service bay. The time slot can also identify a time in which a part needed to perform the service operation may be available.

The method further comprises identifying a part that corresponds to the plurality of dealership attributes. For example, the method further comprises identifying a part that is needed to perform the service operation and determining whether the part is available at the dealership by determining whether the part is listed in the plurality of dealership attributes.

In some examples, scheduling an appointment for the vehicle to perform the service operation includes scheduling the service bay, the mechanic, and the part based on the mapping for the time slot. That is, scheduling an appointment includes identifying a time slot in which the service bay is available, the mechanic is available, and the parts needed to perform the service operation are available.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A system to schedule a service appointment, comprising:
one or more processors;
electronic memory accessible by the one or more processors, the electronic memory to store a diagnostic trouble code (DTC) of an automobile, a plurality of attributes of a plurality of service centers, and a scheduling application; and
a network interface to enable communication with the automobile and with the plurality of service centers;

the scheduling application configured to, by the one or more processors:
receive, via the network interface, the DTC from the automobile;
interpret a service operation that resolves the DTC;
update, via communication with the plurality of service centers, the plurality of attributes of the plurality of service centers, the plurality of attributes including:
one or more dates of expected arrival at each of the plurality of service centers of a part required to perform the service operation that resolves the DTC;
whether each of the plurality of service centers has the part required to perform the service operation that resolves the DTC in its inventory;
whether each of the plurality of service centers has an associated mechanic who is qualified to perform the service operation that resolves the DTC and is available to perform the service operation; and
whether the service operation at each of the plurality of service centers requires a service bay; and
if the service operation at each of the plurality of service centers requires a service bay, whether attributes of the service operation are compatible with attributes of an available service bay necessary to perform the service operation;
map the service operation that resolves the DTC to a selected service center from the plurality of service centers based on the plurality of attributes of the selected service center; and
schedule an appointment with the selected service center, the scheduled appointment identifying a time slot at the selected service center wherein a part, a mechanic, and a service bay according to the map are available at the selected service center.

2. The system of claim 1, wherein the plurality of attributes of the plurality of service centers describe an ability of a respective service center from the plurality of service centers to perform the service operation that resolves the DTC.

3. A method for scheduling a service appointment, comprising:
receiving, via a network interface, a diagnostic trouble code (DTC) from an automobile;
interpreting, via a computing device, a service operation that resolves the DTC;
accessing, via the computing device, a plurality of operation attributes of the service operation that resolves the DTC;
updating, at the computing device, a plurality of center attributes of a plurality of service centers using information received at the computing device from the plurality of service centers via the network interface, the plurality of center attributes of the plurality of service centers including:
one or more dates of expected arrival at each of the plurality of the service centers of a part required to perform the service operation;
whether each of the plurality of service centers has the part required to perform the service operation in its inventory;
whether each of the plurality of service centers has an associated mechanic who is qualified to perform the service operation and is available to perform the service operation; and
whether the service operation at each of the plurality of service centers requires a service bay; and
if the service operation at each of the plurality of service centers requires a service bay, whether attributes of the service operation are compatible with attributes of an available service bay necessary to perform the service operation;
mapping, via the computing device, the plurality of operation attributes to the plurality of center attributes;
identifying a service center from a subset of the plurality of service centers, each service center of the subset of the plurality of service centers including the plurality of service center attributes that is mapped to the plurality of operation attributes; and
scheduling an appointment with the identified service center, the scheduled appointment identifying a time slot at the identified service center wherein a part, a mechanic, and a service bay according to the mapping are available at the identified service center.

4. The method of claim 3, wherein the plurality of operation attributes define requirements to perform the service operation that resolves the DTC.

5. The method of claim 4, wherein the plurality of operation attributes include a skill needed to perform the service operation that resolves the DTC.

6. The method of claim 5, wherein the skill needed to perform the service operation that resolves the DTC includes an accreditation to perform the service operation that resolves the DTC.

7. The method of claim 5, wherein the skill needed to perform the service operation that resolves the DTC includes the skill needed to perform the service operation that resolves the DTC on the automobile make and model.

8. The method of claim 3, wherein the plurality of operation attributes include a duration of time to perform the service operation that resolves the DTC.

9. The method of claim 3, wherein the plurality of operation attributes include parts needed to perform the service operation that resolves the DTC.

10. The method of claim 3, wherein the plurality of operation attributes include whether a service bay is required to perform the service operation that resolves the DTC.

* * * * *